(12) United States Patent
Tominaga et al.

(10) Patent No.: US 10,866,449 B2
(45) Date of Patent: Dec. 15, 2020

(54) LIQUID CRYSTAL DISPLAY APPARATUS WITH TOUCH SENSOR AND METHOD FOR DRIVING SAME

(71) Applicant: Sharp Kabushiki Kaisha, Sakai (JP)

(72) Inventors: Masakatsu Tominaga, Sakai (JP); Yoshihito Hara, Sakai (JP); Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/462,270

(22) PCT Filed: Nov. 14, 2017

(86) PCT No.: PCT/JP2017/040901
§ 371 (c)(1),
(2) Date: May 20, 2019

(87) PCT Pub. No.: WO2018/092758
PCT Pub. Date: May 24, 2018

(65) Prior Publication Data
US 2019/0339557 A1    Nov. 7, 2019

(30) Foreign Application Priority Data

Nov. 21, 2016    (JP) ................................. 2016-225873

(51) Int. Cl.
*G06F 3/045*    (2006.01)
*G02F 1/1333*    (2006.01)
(Continued)

(52) U.S. Cl.
CPC ........ *G02F 1/13338* (2013.01); *G02F 1/1343* (2013.01); *G02F 1/1368* (2013.01);
(Continued)

(58) Field of Classification Search
USPC ................................. 345/173, 174, 205, 698
See application file for complete search history.

(56) References Cited

U.S. PATENT DOCUMENTS 10,725,326 B2 *   7/2020   Yoshino ................ G06F 3/0446
                                                               345/174
2010/0182273 A1   7/2010   Noguchi et al.
(Continued)

FOREIGN PATENT DOCUMENTS

JP    10-319434 A    12/1998
JP    2009-244958 A   10/2009
(Continued)

OTHER PUBLICATIONS

Official Communication issued in International Patent Application No. PCT/JP2017/040901, dated Jan. 23, 2018.

*Primary Examiner* — Thuy N Pardo
(74) *Attorney, Agent, or Firm* — Keating & Bennett, LLP

(57) ABSTRACT

A liquid crystal display apparatus (101) with a touch sensor includes a first substrate (10), a second substrate (20), a liquid crystal layer (8) provided between the first substrate and the second substrate, plurality of pixel electrodes 2 and a first common electrode (4) for applying a voltage to the liquid crystal layer, a plurality of first electrodes and a plurality of second electrodes for the touch sensor, the liquid crystal layer includes liquid crystals having negative dielectric anisotropy, the first substrate includes the plurality of pixel electrodes (2) the first common electrode (4) disposed on the plurality of pixel electrodes and an insulating layer, the second substrate includes a second transparent substrate (21) and a second common electrode (9) formed on a side of the second transparent substrate facing the liquid crystal layer, the first common electrode (4) includes a plurality of first common electrode portions (4p) serving also as a plurality of first electrodes for the touch sensor, and the
(Continued)

second common electrode (9) includes a plurality of second common electrode portions (9p) serving also as a plurality of second electrodes for the touch sensor.

20 Claims, 18 Drawing Sheets

(51) Int. Cl.
- *G02F 1/1343* (2006.01)
- *G02F 1/1362* (2006.01)
- *G02F 1/1368* (2006.01)
- *G06F 3/041* (2006.01)
- *G06F 3/044* (2006.01)
- *G09G 3/36* (2006.01)

(52) U.S. Cl.
CPC ........ *G02F 1/136286* (2013.01); *G06F 3/044* (2013.01); *G06F 3/0412* (2013.01); *G09G 3/3648* (2013.01)

(56) References Cited

U.S. PATENT DOCUMENTS

| | | |
|---|---|---|
| 2014/0028616 A1 | 1/2014 | Furutani et al. |
| 2014/0118639 A1 | 5/2014 | Matsushima |
| 2014/0152613 A1 | 6/2014 | Ishizaki et al. |
| 2014/0160061 A1 | 6/2014 | Kim et al. |
| 2014/0292676 A1 | 10/2014 | Hayashi et al. |
| 2014/0292709 A1 | 10/2014 | Mizuhashi et al. |
| 2015/0177880 A1 | 6/2015 | Shin et al. |
| 2015/0193057 A1* | 7/2015 | Kosugi ............... G06F 3/04166 345/174 |
| 2015/0205433 A1 | 7/2015 | Mizuhashi et al. |
| 2015/0331518 A1 | 11/2015 | Kaneko et al. |
| 2016/0195960 A1* | 7/2016 | Takeuchi ................ G06F 3/044 345/174 |
| 2016/0253030 A1 | 9/2016 | Tada |
| 2016/0364082 A1* | 12/2016 | Kimura ............... G02F 1/13306 345/174 |
| 2017/0123253 A1* | 5/2017 | Sugita ................. G06F 3/0446 345/174 |
| 2017/0185190 A1* | 6/2017 | Jung ................... H01L 27/1225 345/174 |
| 2017/0185195 A1* | 6/2017 | Kim ..................... G09G 3/3648 345/174 |
| 2017/0185196 A1* | 6/2017 | Kim ..................... G06F 3/0412 345/174 |
| 2017/0192580 A1* | 7/2017 | Jung ................. G02F 1/136286 345/174 |
| 2019/0004655 A1* | 1/2019 | Kim ..................... G06F 3/04166 345/174 |

FOREIGN PATENT DOCUMENTS

| | | |
|---|---|---|
| JP | 2014-041603 A | 3/2014 |
| JP | 2014-102499 A | 6/2014 |
| JP | 2014-109904 A | 6/2014 |
| JP | 2014-115647 A | 6/2014 |
| JP | 2014-199492 A | 10/2014 |
| JP | 2014-199605 A | 10/2014 |
| JP | 2015-122057 A | 7/2015 |
| JP | 2015-135622 A | 7/2015 |
| JP | 2015-232876 A | 12/2015 |
| WO | 2015/059995 A1 | 4/2015 |

\* cited by examiner (a)

(b)

—— ABSENCE OF TOUCH
········ PRESENCE OF TOUCH

LIQUID CRYSTAL DISPLAY APPARATUS WITH TOUCH SENSOR AND METHOD FOR DRIVING SAME

TECHNICAL FIELD

The present invention relates to liquid crystal display apparatuses with touch sensors and methods for driving same and specifically, to a liquid crystal display apparatus with a capacitive touch sensor and a method for driving the liquid crystal display apparatus.

BACKGROUND ART

A display apparatus with a touch sensor (hereinafter referred to as "touch panel") has recently been widely used in smartphones, tablet-type portable terminals, and the like. As the touch sensor, various types of touch sensors such as a resistive touch sensor, a capacitive touch sensor, and an optical touch sensor are known. Among them, a projection-type capacitive touch sensor which is compatible with multi-point touch and which enables touch position detection with high accuracy has widely been used. The capacitive touch sensor includes a drive electrode (hereinafter referred to as a "touch scan electrode") and a touch detection electrode disposed to face each other with a dielectric layer therebetween. Capacitance formed between the touch scan electrode and the touch detection electrode changes depending on the presence or absence of contact by an object (for example, a finger). Thus, forming a detection signal in accordance with the change of the capacitance enables the presence or absence of the contact to be detected.

A touch panel is a built-in touch panel or an external touch panel (a polarizing plate is disposed on an observer side and a touch sensor is disposed on the observer side of the polarizing plate). The built-in touch panel is either an on-cell type touch panel or an in-cell type touch panel. Here, a cell is a display cell (hereinafter referred to as a "display panel"), and for example, a liquid crystal display panel includes a pair of substrates (for example, a TFT substrate and a counter substrate) facing each other with a liquid crystal layer therebetween and includes no polarizing plate. The term "in-cell type" describes that a layer having a touch panel function is provided in a display panel. On the other hand, the term "on-cell type" describes that a layer having a touch panel function is disposed between a display panel and a polarizing plate (for example, between a counter substrate and the polarizing plate). Alternatively, a layer having a touch panel function may be disposed in a display panel and between the display panel and a polarizing plate, which is called "hybrid type". Here, the term "hybrid type" is also referred to as "on-cell type" since at least part of the layer having the touch panel function is disposed between the display panel and the polarizing plate. A built-in touch panel is more advantageous than an external touch panel in terms of reduction in thickness and weight, and the transmittance of light is increased.

PTL 1 and PTL 2 disclose that in a built-in touch panel including a liquid crystal display panel in a lateral electric field mode, a common electrode provided to a TFT substrate is used as a touch scan electrode. Thus, a touch sensor which is hardly influenced by the potential of a user (finger) is obtained.

For example, PTL 2 discloses an in-cell type touch panel and an on-cell type touch panel including a liquid crystal display panel in a Fringe Field Switching (FFS) mode. The liquid crystal layer includes a positive liquid crystal material (see FIG. 10 of PTL 2). In the in-cell type touch panel in PTL 2, the common electrode formed on the TFT substrate is used as a touch scan electrode, and the touch detection electrode is formed on a side of counter substrate facing a liquid crystal layer (FIGS. 13, 14, and the like in PTL 2). In the on-cell type touch panel, the common electrode formed on the TFT substrate is used as a touch scan electrode, and the touch detection electrode is formed (in a space between the counter substrate and the polarized plate) on an observer side of a counter substrate (FIG. 9, and the like in PTL 2). In the on-cell type touch panel, a touch detection electrode has to be formed on an opposite surface of a transparent substrate (glass substrate) of the counter substrate from a liquid crystal layer side surface provided with a color filter layer and the like. Thus, in comparison with the in-cell type touch panel, the on-cell type touch panel has problems that production cost is high, a thickness reduction of the glass substrate is difficult, and the like.

CITATION LIST

Patent Literature

PTL 1: Japanese Unexamined Patent Publication No. 2014-109904

PTL 2: Japanese Unexamined Patent Publication No. 2009-244958

SUMMARY OF INVENTION

Technical Problem

The inventors of the present invention, however, have studied and found that the in-cell type touch panel disclosed in PTL 2 has problems, for example, that transmittance of light is reduced and display unevenness occurs along application of a drive signal to the touch scan electrode when a touch detection operation is performed. Moreover, the inventors found that when a liquid crystal display operation (writing operation on a pixel electrode) is performed, a high display quality is not be obtained in some cases due to alignment disturbance of liquid crystals. Details will be described later.

In view of the foregoing, it is an object of the present invention to provide a liquid crystal display apparatus with a touch sensor, the liquid crystal display apparatus enabling a light transmittance ratio and a display quality to be increased.

Solution to Problem

A liquid crystal display apparatus with a touch sensor of one aspect of the present invention is a liquid crystal display apparatus with a touch sensor, the liquid crystal display apparatus including a display area and a peripheral area, the display area including a plurality of pixels two-dimensionally arranged in a first direction and a second direction transverse to the first direction, the peripheral area being located in a periphery of the display area, the liquid crystal display apparatus including: a first substrate; a second substrate disposed to face the first substrate; a liquid crystal layer provided between the first substrate and the second substrate; a plurality of pixel electrodes and a first common electrode for applying a voltage to the liquid crystal layer; and a plurality of first electrodes and a plurality of second electrodes for the touch sensor, wherein the plurality of first electrodes are a plurality of touch detection electrodes and the plurality of second electrodes are a plurality of touch scan electrodes, or the plurality of first electrodes are a plurality of touch scan electrodes and the plurality of second electrodes are a plurality of touch detection electrodes, wherein the display area includes a plurality of touch detection units, each of the plurality of touch detection unit being a portion at which one of the plurality of touch detection electrodes crosses one of the plurality of touch scan electrodes, the liquid crystal layer includes liquid crystals having negative dielectric anisotropy, the first substrate includes a first transparent substrate, a plurality of gate lines each extending in the first direction, a plurality of source lines each extending in the second direction, the plurality of pixel electrodes disposed on a side of the first transparent substrate facing the liquid crystal layer, and the first common electrode disposed on the side of the first transparent substrate facing the liquid crystal layer via the plurality of pixel electrodes and an insulating layer, the second substrate includes a second transparent substrate and a second common electrode formed on a side of the second transparent substrate facing the liquid crystal layer, the first common electrode includes a plurality of first common electrode portions, the plurality of first common electrode portions serving also as the plurality of first electrodes for the touch sensor, and the second common electrode includes a plurality of second common electrode portions, the plurality of second common electrode portions serving also as the plurality of second electrodes for the touch sensor.

In an aspect, the second substrate is disposed on an observer side of the first substrate, the plurality of first common electrode portions serve also as the plurality of touch scan electrodes, and the plurality of second common electrode portions serve also as the plurality of touch detection electrodes.

In an aspect, in the peripheral area, the first substrate further includes a scan driver connected to the plurality of first common electrode portions and a semiconductor chip mounting region in which a semiconductor chip is mounted, wherein the scan driver is disposed between either the semiconductor chip mounting region or the semiconductor chip mounting region and the display area.

In an aspect, the first substrate further includes a plurality of scan lines which connect the plurality of first common electrode portions to the scan driver, and each of the plurality of scan lines has a portion located in the display area.

In an aspect, two or more of the scan lines are provided to each of the plurality of first common electrode portions.

In an in an aspect, each of the plurality of first common electrode portions extends in the display area in the first direction, and each of the plurality of second common electrode portions extends across the display area in the second direction.

In an aspect, each of the plurality of first common electrode portions extends across the display area in the second direction, and each of the plurality of second common electrode portions extends across the display area in the first direction.

In an aspect, the first substrate is disposed on an observer side of the second substrate, the plurality of first common electrode portions serve also as the plurality of touch detection electrodes, and the plurality of second common electrode portions serve also as the plurality of touch scan electrodes.

In an aspect, each of the plurality of first common electrode portions extends across the display area in the second direction, and each of the plurality of second common electrode portions extends across the display area in the first direction.

In an aspect, each of the plurality of first common electrode portions extends across the display area in the first direction, and each of the plurality of second common electrode portions extends across the display area in the second direction.

In an aspect, each of the plurality of second common electrode portions extends across the display area to the peripheral area, and part of each of the plurality of second common electrode portions which is located in the peripheral area is electrically connected to a side of the first substrate via a contact column disposed between the first substrate and the second substrate.

In an aspect, the second substrate further includes a color filter layer, and the second common electrode is disposed between the color filter layer and the second transparent substrate.

In an aspect, the second substrate further includes a color filter layer, and the second common electrode is disposed between the color filter layer and the liquid crystal layer.

In an aspect, the plurality of pixel electrodes are disposed between the first common electrode and the liquid crystal layer.

In an aspect, the first common electrode is disposed between each of the plurality of pixel electrodes and the liquid crystal layer.

In an aspect, the liquid crystal display apparatus with the touch sensor further includes a gate driver connected to the plurality of gate lines; a source driver connected to the plurality of source lines; a scan driver connected to the plurality of touch scan electrodes; a detection driver connected to the plurality of touch detection electrodes; and a control circuit configured to perform control of the gate driver, the source driver, the scan driver, and the detection driver, wherein each of the plurality of touch scan electrodes extend in the display area in the first direction, the display area includes a plurality of subareas obtained by dividing the display area in the first direction, the control circuit performs the control such that, after a touch detection operation and a pixel writing operation on a selected subarea of the plurality of subareas are finished, a touch detection operation and a pixel writing operation is performed on a next subarea, and after a touch detection operation is performed on each of the plurality of subareas with a pixel writing operation being stopped, a pixel writing operation is performed with a touch detection operation being stopped.

A method for driving a liquid crystal display apparatus with a touch sensor of an aspect of the present invention is a method for driving the above-described liquid crystal display apparatus with the touch sensor, wherein each of the plurality of touch scan electrodes extend in the display area in the first direction, and the display area includes a plurality of subareas obtained by dividing the display area in the first direction, each of the plurality of subareas corresponding to one or two or more touch detection units in the plurality of touch detection units, the method including: (A) a touch detection step of performing a touch detection operation on a selected subarea of the plurality of subareas with a pixel writing operation being stopped, the touch detection step including a step of inputting a scan signal to a selected touch scan electrode disposed in the selected subarea of the plurality of touch scan electrodes and inputting a common signal to the plurality of touch detection electrodes to read, as a detection signal, a change of a potential of a selected touch detection electrode of the plurality of touch detection electrodes, the selected touch detection electrode being disposed in the selected subarea; and (B) a pixel writing step of performing a pixel writing operation on the selected subarea with a touch detection operation being stopped, win in the pixel writing step, a common signal is input to the plurality of touch scan electrodes and the plurality of touch detection electrodes, wherein the steps (A) and (B) are repeated on all the plurality of subareas.

In an aspect, in the step (A), the common signal is input to a non-selected touch scan electrode other than the selected touch scan electrode of the plurality of touch scan electrodes, or the non-selected touch scan electrode is in a floating state.

In an aspect, in the step (A), a gate signal is input to a selected gate line of the plurality of gate lines, the selected gate line being disposed in the selected subarea, the gate signal being in phase with the scan signal and having an amplitude equal to an amplitude of the scan signal.

In an aspect, in the step (B), a gate OFF voltage Vgl is supplied to non-selected gate line other than the selected gate line of the plurality of gate lines, or the non-selected gate line is in a floating state.

Advantageous Effects of Invention

An aspect of the present invention provides a liquid crystal display apparatus with a touch sensor, the liquid crystal display apparatus enabling a light transmittance ratio and a display quality to be increased.

DESCRIPTION OF EMBODIMENTS

Figure 1:
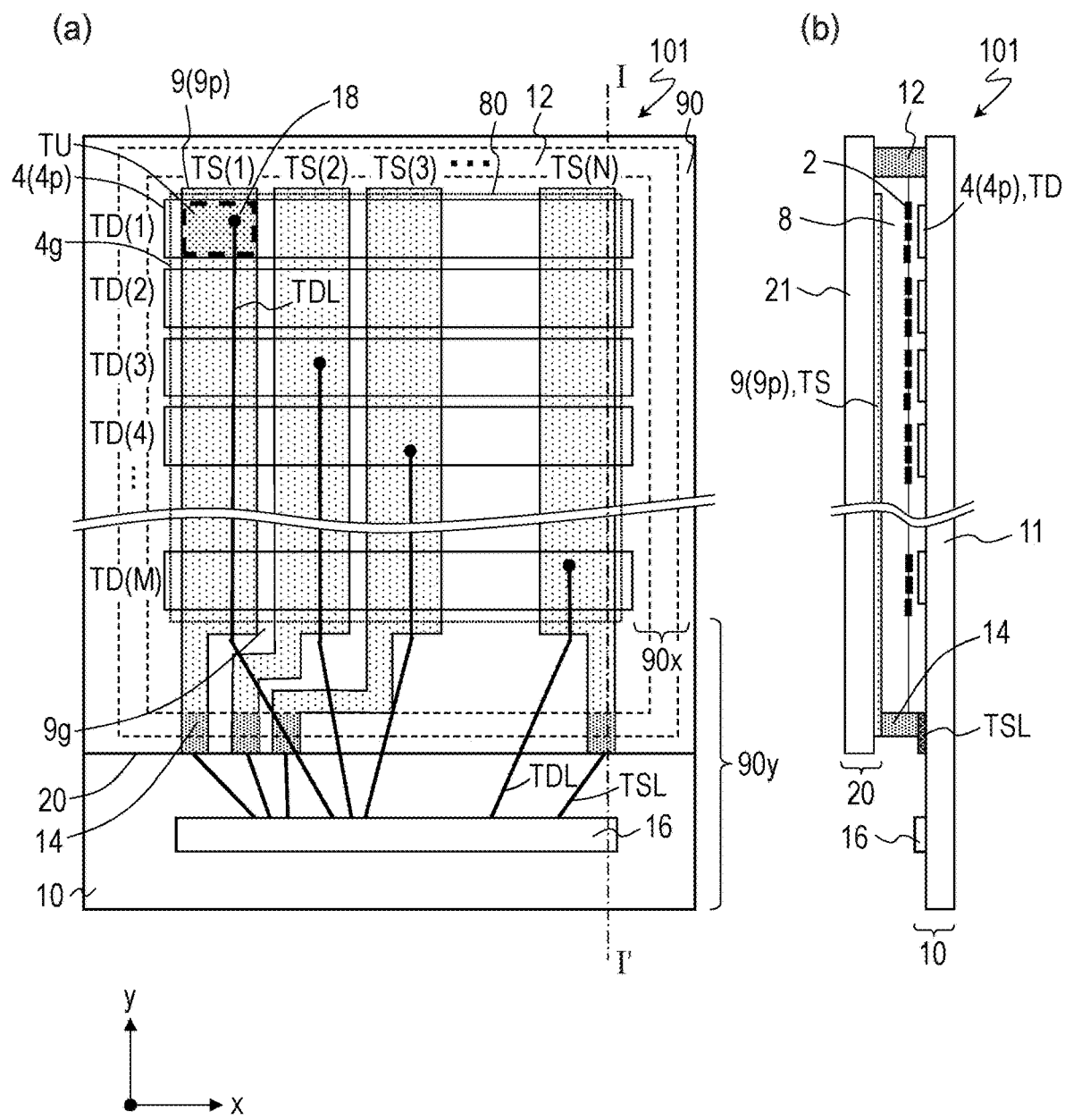
FIGS. 1(a) and 1(b) are respectively a top view and a sectional view illustrating a touch panel 101 of the first embodiment.

An in-cell type touch panel of a known technique has the following problems.

The built-in touch panel disclosed in PTL 2 adopts a positive liquid crystal material having positive dielectric anisotropy, and liquid crystal molecules each have a property that a long axis direction thereof tends to align in an electric field direction. Thus, when electric field lines are generated due to a touch detection electrode and TFT substrate-side electrodes, the liquid crystal molecules are aligned to be parallel to the electric field lines, and the liquid crystal molecules are oriented in the longitudinal direction (in a thickness direction of a liquid crystal layer). As a result, the transmittance ratio of light may be significantly reduced. For example, for detection of a touch, when a touch scan electrode is operated (that is, the potential of the touch scan electrode is changed), electric field lines in the vertical direction generated between the touch detection electrode and the touch scan electrode change. Thus, stripe-like display unevenness according to the pattern of the touch scan electrode may occur.

In particular, in the in-cell type touch panel, the touch detection electrode is disposed closer to the liquid crystal layer than the transparent substrate (for example, glass substrate) of the counter substrate is, and the touch detection electrode faces electrodes disposed on a TFT substrate (a pixel electrode and a touch scan electrode, hereinafter referred to as "TFT substrate-side electrodes") via the liquid crystal layer. Thus, as compared to an on-cell type touch panel in which a touch detection electrode and TFT substrate-side electrodes are disposed to face each other with a glass substrate therebetween, the influence of electric field lines generated between the touch detection electrode and each of the TFT substrate-side electrodes over the liquid crystal layer increases, and display unevenness more likely to occur.

Thus, the inventors of the present invention considered a configuration in which a negative liquid crystal material having negative dielectric anisotropy is adopted for a liquid crystal layer. The negative liquid crystal material has a property that the short axis direction of the liquid crystal molecules tends to align in the electric field direction. Thus, even when electric field lines are generated due to the touch detection electrode and the TFT substrate-side electrodes, the liquid crystal molecules are aligned in the lateral direction to be vertical to the electric field lines and do not change in the vertical direction. Thus, as compared to the positive liquid crystal material, it is possible to suppress a reduction of transmission ratio due to the electric field lines between the electrodes and/or to reduce occurrence of the display unevenness.

Also when the negative liquid crystal material is used, however, if, for example, an object (for example, an electrically charged person) comes into contact with the counter substrate, an electric field component in a lateral direction (parallel to the substrate) may be generated on a side of the counter substrate. When the electric field component in the lateral direction is generated, the liquid crystal molecules may be turned to be aligned in the vertical direction. Such alignment disturbance of liquid crystals may cause display unevenness.

In contrast, the inventors of the present invention adopt a configuration in which the electrode used for a touch sensor and provided to the counter substrate is used as a common electrode. In the present specification, the common electrode provided to the TFT substrate is referred to as a "first common electrode", and the common electrode provided to the counter substrate is referred to as a "second common electrode". During a potential writing operation to a pixel electrode, a common signal is supplied to the first and second common electrodes. The second common electrode is provided, and therefore, even when a charge is generated due to, for example, contact of an object to the counter substrate, the electric field lines are absorbed into the second common electrode and have thus no influence over the alignment of liquid crystals. Thus, it is possible to further stabilize the alignment of liquid crystals between the first common electrode and the second common electrode. Moreover, the electrode for the touch sensor serves also as the second common electrode, and thereby, another conductive layer does not have to be formed on the counter substrate. Thus, it is possible to suppress a reduction of display quality caused due to alignment disturbance of liquid crystals while the thickness of the touch panel and an increase of the production cost of the touch panel are suppressed.

A liquid crystal display apparatus with a touch sensor (hereinafter referred to as a "touch panel") of one embodiment of the present invention will be more specifically described below. The touch panel according to the embodiment of the present invention is not limited to the touch panel described below. Moreover, in the figures below, components having substantially the same function are denoted by common reference signs, and the description thereof may be omitted.

First Embodiment

A touch panel of a first embodiment of the present invention is an in-cell type touch panel including a liquid crystal display panel in a lateral electric field mode (for example, FFS mode).

Overall Structure of Touch Panel 101

FIGS. 1(a) and 1(b) are respectively a top view and a sectional view illustrating a touch panel 101 of the first embodiment. FIG. 1(b) is a sectional view taken along line I-I' of FIG. 1(a).

A touch panel 101 has a display area 80 and a peripheral area 90 located in the periphery of the display area 80. Although not shown, the display area 80 includes a plurality of gate lines extending substantially parallel to each other in the x direction (first direction), a plurality of source lines extending substantially parallel to each other in the y direction (second direction), and a plurality of pixels two-dimensionally arranged in the x direction and the y direction. The y direction is a direction transverse to the x direction and may be orthogonal to the x direction.

The display area 80 further includes a plurality of touch detection units TU which are two-dimensionally arranged. In the example shown in the figure, the touch detection units TU are two-dimensionally arranged in the x direction and the y direction. Each touch detection unit TU may be disposed, for example, to correspond to two or more pixels.

On the other hand, in the peripheral area 90, peripheral circuits including drive circuits, a terminal unit, and the like are provided. On the peripheral area 90, a semiconductor chip 16 including some or all of the drive circuits may be mounted. Although not shown, the drive circuits include a gate driver, a source driver, a scan driver, and a detection driver. These drive circuits are provided to (mounted on or formed integrally with), for example, a first substrate 10. In the present specification, of the peripheral area 90, areas adjacent to the display area 80 in a direction (x direction) in which the gate lines extend are referred to as first peripheral areas 90x, and areas adjacent to the display area 80 in a direction (y direction) in which the source lines extend are referred to as second peripheral areas 90y. In FIG. 1(a), of the peripheral area 90, portions located on a right side and on a left side of the display area 80 are the first peripheral areas 90x, and portions located on a lower side and on an upper side of the display area 80 are the second peripheral areas 90y. For example, the semiconductor chip 16 including the source driver, the scan driver, and the detection driver is mounted on the second peripheral area 90y, and the gate driver may be integrally (monolithically) formed in the first peripheral area 90x.

The touch panel 101 includes a TFT substrate (hereinafter referred to as a "first substrate") 10, a counter substrate (hereinafter referred to as a "second substrate") 20 disposed to face the first substrate 10, and a liquid crystal layer 8 provided between the first substrate 10 and the second substrate 20.

The liquid crystal layer 8 is a horizontal alignment liquid crystal layer including a (negative) nematic liquid crystal material having a negative dielectric anisotropy. Adopting the negative liquid crystal material, as described in detail later, enables a reduction in light transmittance ratio and display unevenness during a touch detection operation to be suppressed. The negative liquid crystal material is sealed between the first substrate 10 and the second substrate 20 with a sealing material 12.

The touch panel 101 includes a pair of electrodes for applying a voltage to the liquid crystal layer 8 and a pair of electrodes for a touch sensor. As the electrodes for applying a voltage to the liquid crystal layer 8, a plurality of pixel electrodes 2 and a first common electrode 4 are provided to the first substrate 10. As the electrodes for the touch sensor, first electrodes are provided to the first substrate 10 and second electrodes are provided to the second substrate 20. The first electrodes are touch detection electrodes TS serving as reception-side electrodes of the touch sensor and the second electrodes are touch scan electrodes TD serving as transmission-side electrodes of the touch sensor, or the first electrodes are the touch scan electrodes TD serving as the transmission-side electrodes of the touch sensor and the second electrodes are the touch detection electrodes TS serving as the reception-side electrodes of the touch sensor. Typically, electrodes of one of the first substrate 10 and the second substrate 20 which are disposed on an observer side are the touch detection electrodes TS, and electrodes of the other of the first substrate 10 and the second substrate 20 which are disposed on a non-observer side are the touch scan electrodes TD. When viewed in the normal direction to the touch panel 101, respective intersections of the touch scan electrodes TD (here, first common electrode portions 4p) and the touch detection electrodes TS (here, second common electrode portions 9p) are touch detection units TU. Here, an example will be described in which the second substrate 20 is disposed on the observer side of the first substrate 10, the first electrodes are the touch detection electrodes TS, and the second electrodes are the touch detection electrodes TS.

The first substrate 10 includes a first transparent substrate (for example, glass substrate) 11, and the first common electrode 4 and the plurality of pixel electrodes 2 formed on a side of the first transparent substrate 11 facing the liquid crystal layer 8. An insulating layer is disposed between each of the pixel electrodes 2 and the first common electrode 4. In FIG. 1, the pixel electrodes 2 are disposed on a side of the first common electrode 4 facing the liquid crystal layer 8. However, the pixel electrodes 2 may be disposed on a side of the first common electrode 4 facing the first transparent substrate 11. The pixel electrodes 2 are electrically independent for each pixel. The first common electrode 4 includes a plurality of first common electrode portions 4p arranged at intervals 4g. In this example, the first common electrode portions 4p extending in the x direction are arranged at the intervals 4g in the y direction. Each first common electrode portion 4p serves also as the touch scan electrode TD. The first common electrode portions 4p may be disposed to correspond to the plurality of pixels. Each first common electrode portion 4p is connected, via a touch scan line TDL, to a scan driver which is not shown. The scan driver may be disposed on, for example, the semiconductor chip 16.

The second substrate 20 includes a second transparent substrate (for example, glass substrate) 21, and a second common electrode 9 formed on a side of the second transparent substrate 21 facing the liquid crystal layer 8. Although not shown, the second substrate 20 may further include a color filter layer. The second common electrode 9 includes a plurality of second common electrode portions 9p arranged at intervals 9g. In this example, the second common electrode portions 9p extending in the y direction are arranged at the intervals 9g in the x direction. Each second common electrode portion 9p serves also as the touch detection electrode TS. The second common electrode portions 9p may be disposed to correspond to the plurality of pixels. Each second common electrode portion 9p is connected, via a touch detection line TSL, to a detection driver. The detection driver may be disposed on, for example, the semiconductor chip 16.

Each second common electrode portion 9p may be electrically connected to a side of the first substrate 10 via a contact column 14 disposed between the first substrate 10 and the second substrate 20 in the peripheral area 90. As the contact column 14, a conductive member having a columnar shape may be adopted. In this example, as the sealing material 12, a sealing material provided with conductive properties (for example, a sealing material including a resin containing spherical conductive particles) is used, and part of the sealing material 12 is used as the contact column 14. Thus, connecting each second common electrode portion 9p to the side of the first substrate 10 via the contact column 14 enables the first substrate 10 to be provided with the detection driver. As a result, only a signal input from the side of the first substrate 10 enables two electrodes for the touch sensor to be driven, and a drive circuit for the touch sensor does not have to be separately mounted on the second substrate 20. Thus, as compared to a case where a drive circuit for the touch sensor is separately mounted on the second substrate 20, it is possible to significantly reduce the thickness of the touch panel 101.

The scan driver may be disposed in a second peripheral area 90y. For example, in the second peripheral area 90y, the scan driver may be disposed in a semiconductor chip mounting region (including a region on the semiconductor chip 16) or a region between the semiconductor chip mounting region and the display area 80. In this case, each touch scan line TDL may extend from the second peripheral area 90y to the display area 80, and in the display area 80, each touch scan line TDL may extend to a corresponding one of the first common electrode portions 4p in the y direction. As described above, in a case where part of each touch scan line TDL is disposed in the display area 80 (in the pixel), it is possible to reduce the area of the peripheral area 90 as compared to a case where the entirety of each touch scan line TDL is disposed in the peripheral area 90.

The disposition of the touch detection units TU is not particularly limited, but the touch detection units TU are preferably arranged in a matrix form in the x direction and the y direction. In the present specification, a set of the plurality of touch detection units TU arranged in the x direction is referred to as a "touch detection unit row", and a set of the plurality of touch detection units TU arranged in the y direction is referred to as a "touch detection unit column". One touch detection electrode TS (or a touch scan electrode TD) which is separated may be disposed for each touch detection unit row, and one touch scan electrode TD (or a touch detection electrode TS) which is separated may be disposed for each touch detection unit column. With this configuration, it is possible to from the touch scan electrodes TD and the touch detection electrodes TS each having a satisfactory width. Thus, even when the touch scan electrodes TD and the touch detection electrodes TS are formed of, for example, only a transparent conductive layer, it is possible to satisfactorily reduce electrical resistance. Thus, even when these electrodes are not assisted by a low-resistance metal film, it is possible to perform a touch detection operation and to suppress an increase of the number of stacked layers.

In the example shown in FIG. 1, each first common electrode portion 4p corresponds to one touch detection unit row and extends in the x direction. Each second common electrode portion 9p corresponds to one touch detection unit column and extends in the y direction. Note that as described later, each first common electrode portion 4p may extend in the y direction, and each second common electrode portion 9p may extend in the x direction. Moreover, when a row including pixels arranged in a row in the x direction is referred to as a "pixel row", and a column including pixels arranged in a column in the y direction is referred to as a "pixel column", each first common electrode portion 4p may be disposed to correspond to one or two or more pixel rows (or pixel columns), and each second common electrode portion 9p may be disposed to correspond to one or two or more pixel columns (or pixel rows).

Note that in the above description, a region (touch sensor array region) in which the touch detection units TU are arranged is substantially the same as the display area 80. However, the touch sensor array region at least partially overlaps the display area 80, and may be larger or smaller than, for example, the display area 80.

Structure of Each Pixel in Touch Panel 101

Next, a structure of each pixel in the touch panel 101 will be described in further detail.

Figure 2:
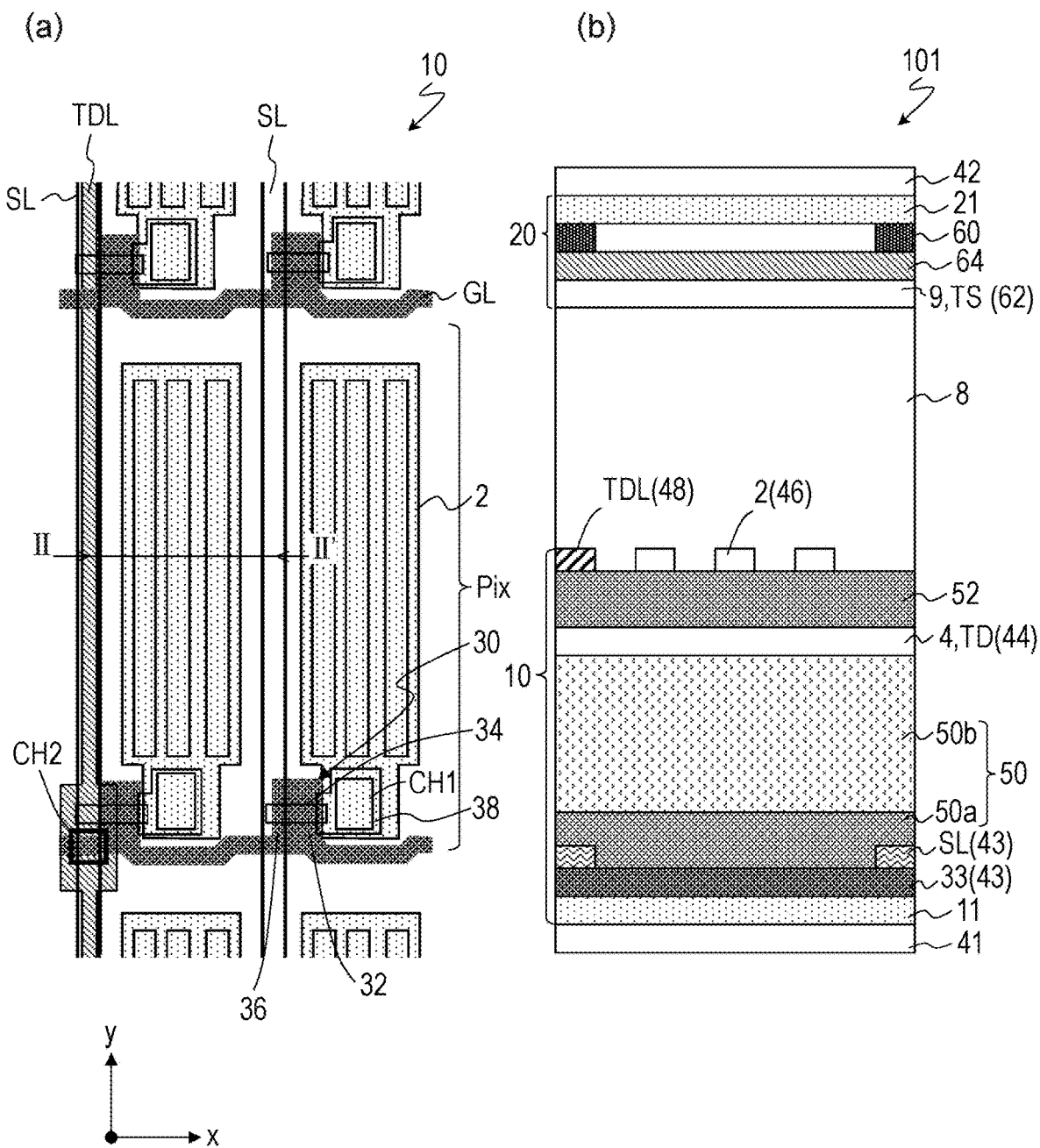
FIG. 2(a) is an enlarged plan view illustrating part of a display area 80 of a first substrate 10.
FIG. 2(b) is a sectional view illustrating a structure of a single pixel in the touch panel 101.

FIG. 2(*a*) is an enlarged plan view illustrating part of the display area 80 of the first substrate 10, wherein two pixels are shown.

The display area 80 of the first substrate 10 includes gate lines GL extending in the x direction, source lines SL extending in the y direction, and a plurality of pixel regions Pix arranged in a matrix form in the x direction and the y direction. The pixel regions Pix are regions corresponding to pixels in the touch panel 101. In this example, each pixel region Pix is defined by the gate line GL and the source line SL.

Each pixel region Pix includes a TFT 30 supported by the first transparent substrate, the pixel electrode 2, and the first common electrode (not shown). The pixel electrode 2 has at least one slit or a cutout for each pixel. The TFT 30 is not particularly limited but is, for example, a bottom gate TFT. The TFT 30 includes a gate electrode 32, a semiconductor layer 34, a gate insulating layer disposed between the gate electrode 32 and the semiconductor layer 34, and a source electrode 36 and drain electrode 38 electrically connected to the semiconductor layer 34. The gate electrode 32 is electrically connected to a corresponding one of the gate lines GL, and the source electrode 36 is electrically connected to a corresponding one of the source lines SL. The gate electrode 32 may be formed in the same layer (gate metal layer) as the gate lines GL, and the source electrode 36 and the drain electrode 38 may be formed in the same layer (source metal layer) as the source line SL. The drain electrode 38 is electrically connected to the pixel electrode 2. In the present specification, a connection part of the drain electrode 38 and the pixel electrode 2 is referred to as a "pixel contact part". In this example, in the pixel contact part, the drain electrode 38 and the pixel electrode 2 are connected in an opening section (hereinafter referred to as a "pixel contact hole") CH1 formed in an insulating layer provided therebetween.

In the display area 80, the plurality of touch scan lines TDL are further disposed. At least one touch scan line TDL is provided to each first common electrode portion, and the touch scan line TDL does not have to be disposed in every pixel region Pix.

Each touch scan line TDL may extend to a corresponding one of the first common electrode portions in, for example, the y direction. In this example, when viewed in the normal direction to the first substrate 10, the touch scan line TDL extends to overlap the source line SL. Each touch scan line TDL is electrically connected to a corresponding one of the first common electrode portions. In the present specification, a connection part of each touch scan line TDL and the first common electrode portion is referred to as a "touch scan electrode contact part". In this example, in the touch scan electrode contact part, each touch scan line TDL and the first common electrode portion are connected in an opening section (hereinafter referred to as a "touch scan electrode contact hole") CH2 formed in an insulating layer provided therebetween. At least one touch scan electrode contact part is provided to one first common electrode portion.

As illustrated in the figure, each touch scan line TDL may include a first portion having a first width and a second portion having a second width larger than the first width. The width of the second portion (second width) may be larger than the width of the source line SL. The first portion and the second portion are both preferably disposed in a light shielding region in which light is shielded by a black matrix disposed on the counter substrate. For example, when viewed in the normal direction to the first substrate 10, the second portion is disposed in the periphery of an intersection of the gate line GL and the source line SL, which enables disposition of also the second portion having a large width in the light shielding region. In the example shown in the figure, each touch scan line TDL extends to overlap a corresponding one of the source lines SL in the y direction. Of each touch scan line TDL, portions that intersect with the gate lines GL are second portions each having the second width, and a portion located between each two adjacent second portions is the first portion having the first width. The touch scan electrode contact hole CH2 is preferably disposed to overlap the second portion of the touch scan line TDL. Thus, it is possible to increase the size of the touch scan electrode contact hole CH2, which enables formation of a contact part having a further reduced resistance.

FIG. 2(*b*) is a sectional view illustrating a structure of a single pixel in the touch panel 101 taken along line II-II' of FIG. 2(*a*).

Each pixel includes the first substrate 10, the second substrate 20, and the liquid crystal layer 8 disposed therebetween. A polarizing plate 41 is disposed on the outside of the first substrate 10 (on a side opposite to the liquid crystal layer 8), and polarizing plate 42 is disposed on the outside of the second substrate 20 (on a side opposite to the liquid crystal layer 8).

The first substrate 10 includes the first transparent substrate 11, an active matrix layer 43 disposed on a side of the first transparent substrate 11 facing the liquid crystal layer 8, and a first insulating layer 50 disposed on the active matrix layer 43. The active matrix layer 43 is a layer including the TFT and includes a gate metal layer including the gate lines GL and the gate electrodes, a gate insulating layer 33, a semiconductor layer, and the source metal layer including the source lines SL and source/drain electrodes. The first insulating layer 50 includes an inorganic insulating layer (passivation layer) 50*a* covering the TFT. The first insulating layer 50 may have a stacked layer structure including the inorganic insulating layer 50*a* and an organic insulating layer 50*b* formed on the inorganic insulating layer 50*a*.

On the first insulating layer 50, a first common electrode layer 44 including the first common electrode 4, a pixel electrode layer 46 including the pixel electrodes 2, and a second insulating layer 52 located between the first common electrode layer 44 and the pixel electrode layer 46 are formed. On the second insulating layer 52, a scan line layer 48 including the touch scan lines TDL may further be formed. In this example, the second insulating layer 52 is disposed on the first common electrode 4, and the touch scan lines TDL and the pixel electrodes 2 are disposed on the second insulating layer 52. Although not shown, the first substrate 10 may further include an alignment film.

When part of each touch scan line TDL is disposed in the display area 80 (in the pixel), each touch scan line TDL is preferably formed in a layer different from the pixel electrode layer 46, the first common electrode layer 44, the source metal layer, and the gate metal layer (in other words, is preferably formed of a conductive film different from the pixel electrodes 2, the source lines SL, the gate lines GL, and the first common electrode 4).

The second substrate 20 includes the second transparent substrate 21, a color filter layer 60, and a second common electrode layer 62 including the second common electrode 9. In this example, the second common electrode layer 62 is disposed closer to the liquid crystal layer 8 than the color filter layer 60 is. Moreover, an overcoat layer 64 is provided between the second common electrode layer 62 and the color filter layer 60.

Note that the order of the stacked layers in the first substrate 10 and the second substrate 20 is not limited to the example shown in FIG. 2(*b*).

Figure 3:
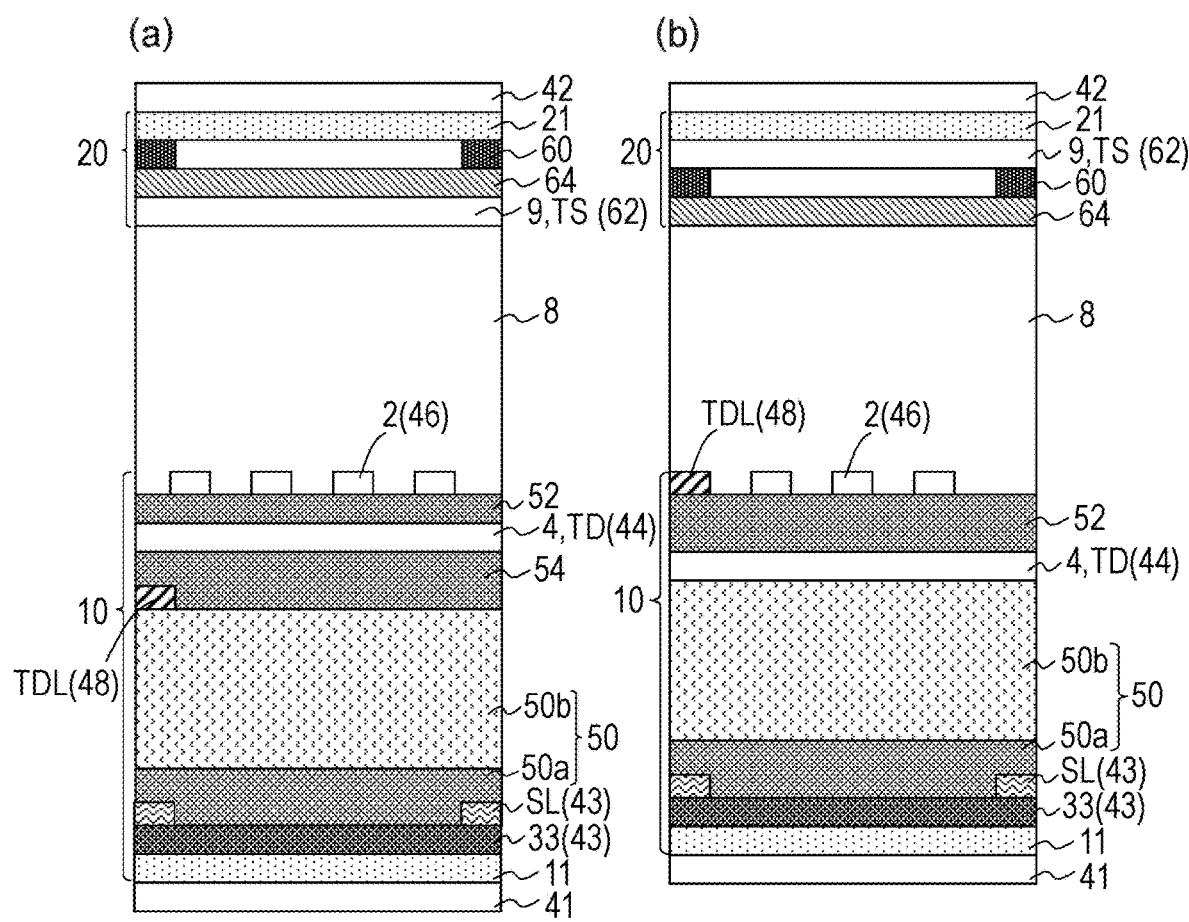
FIGS. 3(a) and 3(b) are sectional views illustrating variations of the touch panel 101.

In the first substrate 10, the touch scan lines TDL may be disposed closer to the first transparent substrate 11 than the first common electrode 4 is. For example, as illustrated in FIG. 3(*a*), the touch scan lines TDL, a third insulating layer 54 covering the touch scan lines TDL, the first common electrode 4, the second insulating layer 52, and the pixel electrodes 2 may be disposed in this order on the first insulating layer 50. In this example, the touch scan electrode contact hole CH2 is formed in the third insulating layer 54. The touch scan lines TDL are disposed closer to the first transparent substrate 11 than the first common electrode 4 is, and thereby, as compared to the example shown in FIG. 2(*b*), it is possible to reduce the influence of the touch scan lines TDL over the alignment of liquid crystals.

In the second substrate 20, the second common electrode 9 is preferably disposed closer to the liquid crystal layer 8 than the second transparent substrate 21 is. When the second common electrode 9 is disposed closer to the liquid crystal layer 8 than the second transparent substrate 21 is, it is possible to connect the second common electrode 9 to the side of the first substrate 10 via the contact column 14. This enables all the drivers for the touch sensor (scan driver and detection driver) to be provided to the first substrate 10, and therefore, it is possible to realize a touch panel having a reduced number of members. As illustrated in FIG. 3(*b*), the second common electrode 9 may be disposed between the color filter layer 60 and the second transparent substrate 21.

Structure of Peripheral Area 90 of Touch Panel 101

In the peripheral area 90, a source driver, a gate driver, a scan driver, and a detection driver are provided as drive circuits. The source driver drives the source lines SL. The gate driver drives the gate lines GL. The scan driver drives the touch scan electrodes TD and the touch scan lines. The detection driver detects a signal from the touch detection electrode TS.

The source driver and the gate driver are typically mounted on or formed monolithically with the first substrate 10. Preferably, the scan driver is also mounted on or formed monolithically with the first substrate 10. In this case, it is possible to reduce the total thickness of the touch panel 101 as compared to a case where the scan driver is mounted on a side of the second substrate 20. Moreover, other drive circuits such as the source driver and the scan driver may be provided on an identical semiconductor chip. This enables an increase of the number of members to be suppressed. Similarly, the detection driver is also preferably provided on the side of the first substrate 10 and may be disposed on the semiconductor chip.

In an example described below, the source driver, the scan driver, and the detection driver are mounted on the first substrate 10 based on a Chip On Glass (COG) mounting system, and the gate driver is formed monolithically with the first substrate 10.

Figure 4:
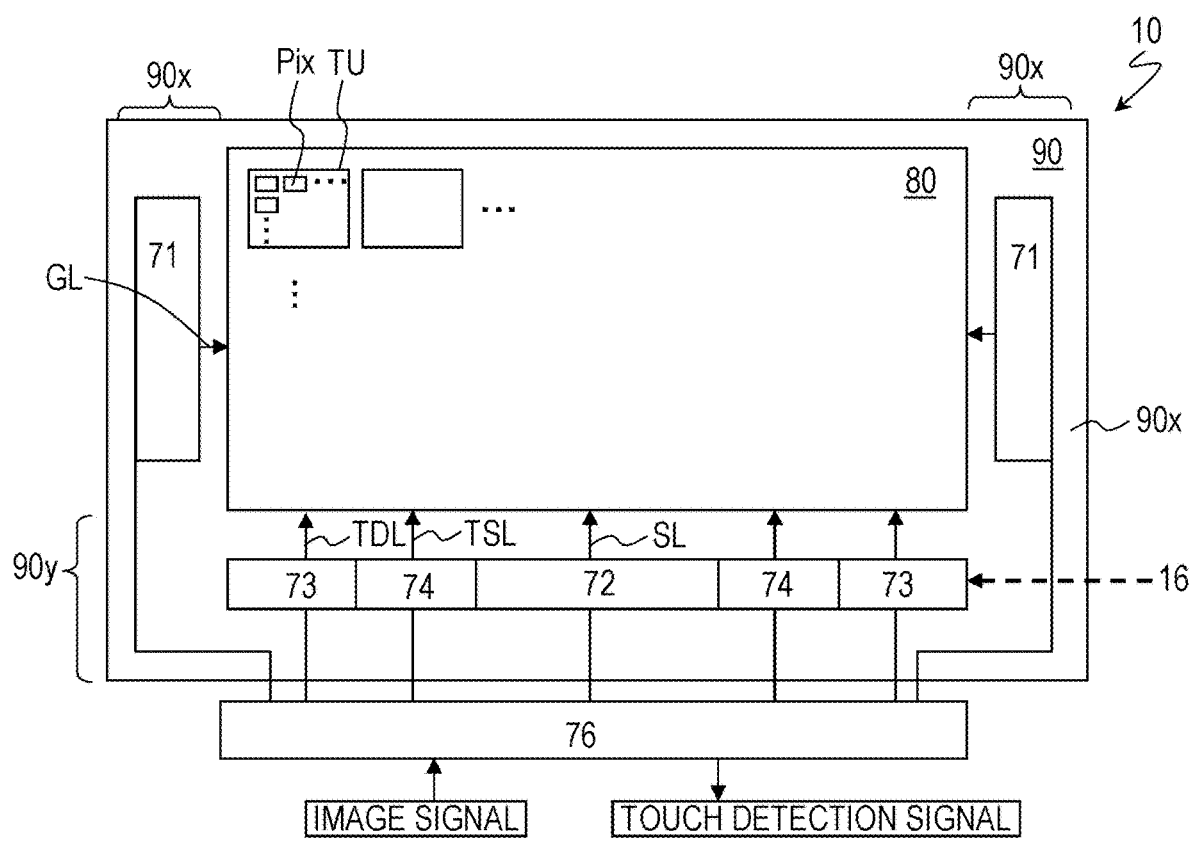
FIG. 4 is a schematic plan view illustrating a structure of a peripheral area 90 in the first substrate 10 of the touch panel 101.

FIG. 4 is a schematic plan view illustrating a structure in the peripheral area 90 of the first substrate 10 of the touch panel 101.

The first substrate 10 includes the display area 80 and the peripheral area 90 located in the periphery of the display area 80. The display area 80 includes the plurality of pixel regions Pix and the touch detection units TU. A gate driver 71, a source driver 72, a scan driver 73, and a detection driver 74 are provided in the peripheral area 90. The gate electrode 71 is connected to the plurality of gate lines GL, and the source electrode 72 is connected to the plurality of source lines SL. The scan driver 73 is connected, via the touch scan lines TDL, to the plurality of touch scan electrodes TD. The detection driver 74 is connected, via the touch detection lines TSL, to the plurality of touch detection electrodes TS.

In this example, the gate driver 71 is integrally (monolithically) formed in each of the first peripheral areas 90*x* located on the right and on the left of the display area 80. Moreover, the semiconductor chip 16 is mounted in the second peripheral area 90*y* located below the display area 80. The semiconductor chip 16 includes the source driver 72, the scan driver 73, and the detection driver 74. In FIG. 4, the detection drivers 74 are disposed on opposing sides of the source drivers 72, and the scan drivers 73 are disposed on opposing sides of the source driver 72, but the number and the order of arrangement of these drive circuits on the semiconductor chip 16 are not limited to these examples.

The first substrate 10 further includes a control unit. The control unit includes a control circuit 76 configured to control operations of the drivers 71 to 74. Each of the drivers 71 to 74 is connected via, for example, an FPC, to the printed wiring board on which the control circuit 76 is formed. The control circuit 76 includes, for example, a timing controller, and based on an externally supplied image signal, the control circuit 76 supplies control signals to the drivers 71 to 74, thereby controlling the operations of these circuits.

Note that in this embodiment, the gate driver 71 is monolithically formed, but the gate driver 71 may be mounted. Moreover, some or all of the other drivers 72 to 74 may be monolithically formed. For example, as described later, the scan driver 73 may be monolithically formed with the peripheral area 90.

Touch Detection Operation of Touch Panel 101

Figure 5:
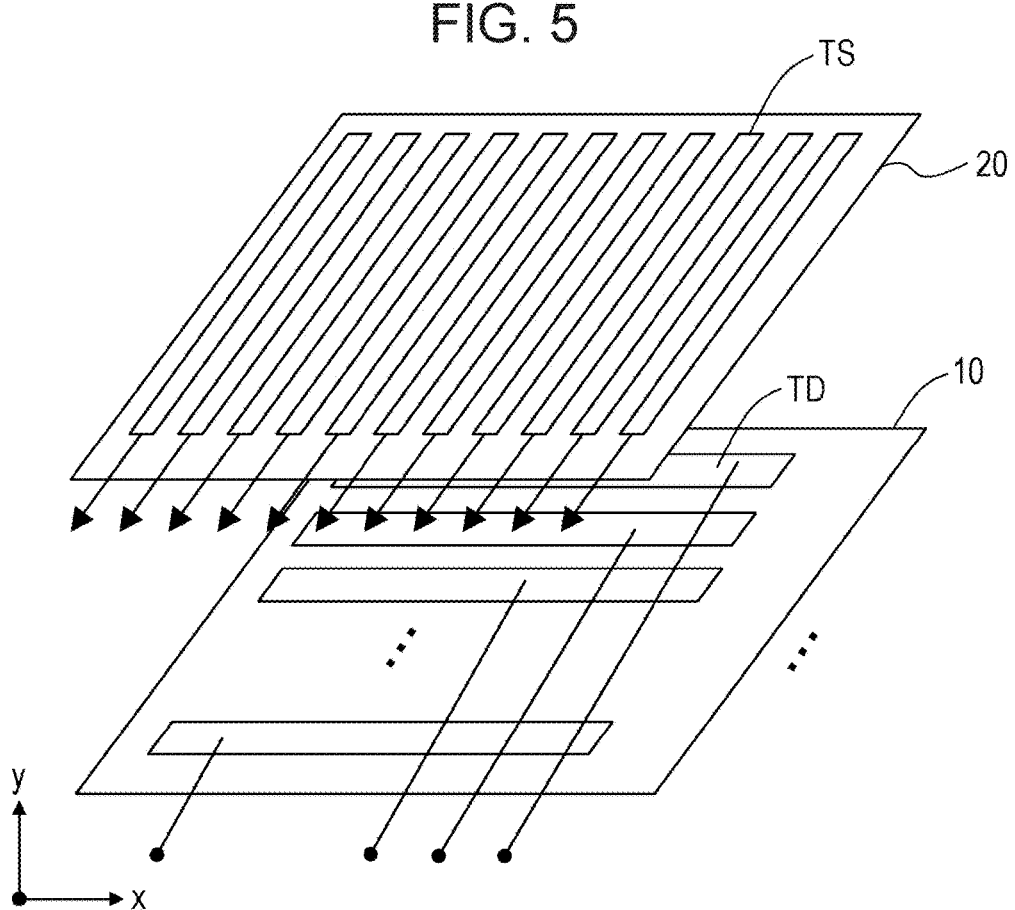
FIG. 5 is view schematically illustrating a touch detection method in the touch panel 101.

Next, with reference to FIG. 5, a touch detection method in the touch panel 101 will be described.

The touch sensor includes the touch scan electrodes TD provided to the first substrate 10 and the touch detection electrodes TS provided to the second substrate 20. In this example, the first substrate 10 is provided with the plurality of touch scan electrodes TD extending in the x direction (the left-and-right direction in the figure). When the touch detection operation is performed, the touch scan electrodes TD are sequentially supplied with drive signals (scan signals) from the scan driver and are driven for sequential scanning in a time division manner. The plurality of touch detection electrodes TS extend in the y direction and are connected to the detection driver. Capacitance is generated at intersections (touch detection units) of the touch scan electrodes TD and the touch detection electrodes TS.

The scan driver supplies scan signals to the touch scan electrodes TD, and thereby, the touch detection electrodes TS output detection signals to the detection driver to perform touch detection. A pattern of electrodes intersecting with each other configures the touch detection units TU (capacitive touch sensors) in a matrix form, and scanning the entirety of a touch detection surface enables the presence or absence of a touch to be detected and the coordinate corresponding to a touch position to be specified.

Figure 6:
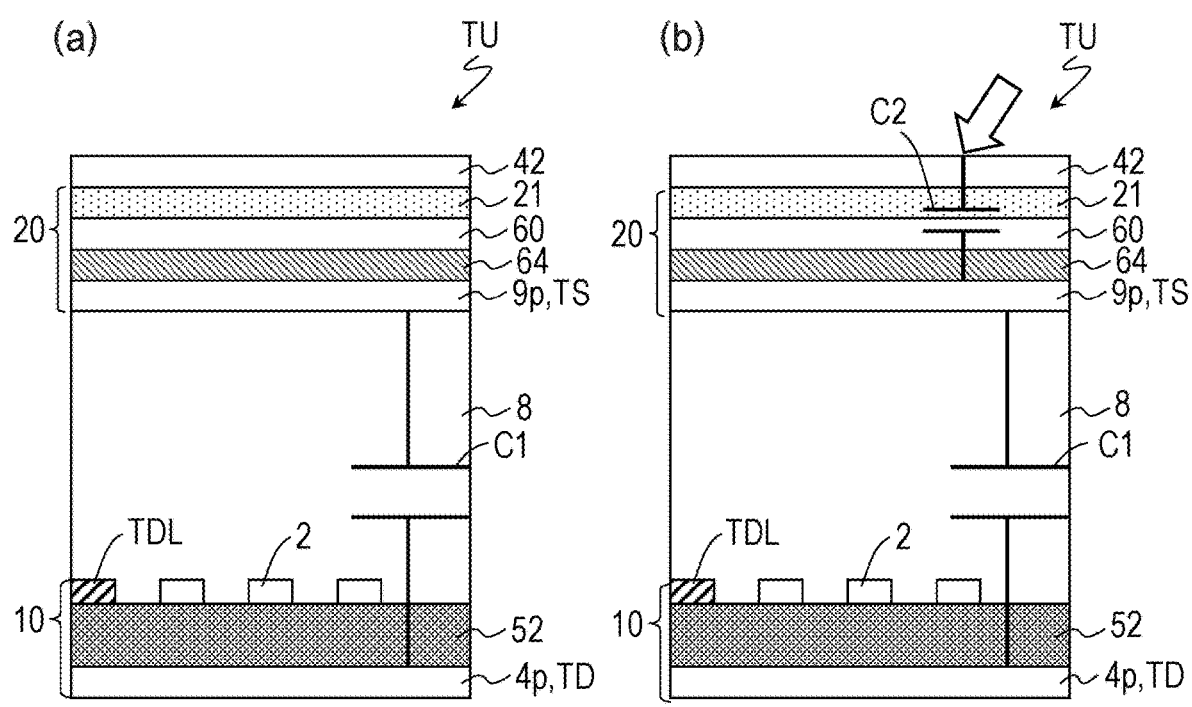
FIGS. 6(a) and 6(b) are sectional views illustrating capacitance generated in a touch detection unit TU.

FIGS. 6(a) and 6(b) are sectional views illustrating capacitance generated in each touch detection unit TU. In the figures, a part of the first substrate 10 lower than the first common electrode portions 4p is omitted. FIG. 6(a) shows a state where an object (for example, a finger) is not in contact with a surface on an observer side of the second substrate 20, and FIG. 6(b) shows a state where the object is in contact with the surface.

FIGS. 7(a) and 7(b) are views illustrating respectively the waveform of a scan signal input to the touch scan electrode TD and the waveform of a detection signal output from the touch detection electrode TS.

When a touch is detected, as illustrated in FIG. 7(a), scan signals are sequentially input to the touch scan electrodes TD to cause AC drive. Here, as each scan signal, an alternating current rectangular wave (Vcom±$V_M$) is used.

As illustrated in FIG. 6(a), when a contact of an object is not found, first capacitance C1 is generated between the first common electrode portion 4p serving as the touch scan electrode TD and the second common electrode portion 9p serving as the touch detection electrode TS. The first capacitance C1 is capacitance corresponding to an area where the touch scan electrode TD and the touch detection electrode TS overlap each other, the thickness and the dielectric constant of the dielectric located between these electrodes.

In this state, the touch detection electrodes TS always receive a common potential Vcom but are affected by un upthrust or a downthrust due to the influence of the scan signal. Thus, a detection signal having a waveform as illustrated in FIG. 7(b) is obtained.

When a conductive object such as a finger comes into contact with or comes close to the touch detection unit TU, second capacitance C2 is generated, as illustrated in FIG. 6(b), between the object and the touch detection electrode TS. This changes the value of capacitance generated in the touch detection unit TU. As a result, the signal waveform of the touch detection electrode TS changes as illustrated in FIG. 7(b). Thus, it is possible to detect the presence or absence of a contact by reading the detection signal from the touch detection electrode TS.

The drive method of the touch panel 101 is not particularly limited. One frame may be time-divided into a touch detection time and a pixel writing time. For example, all the touch scan electrodes TD may be sequentially driven to perform the touch detection operation, and then all the gate lines GL may be sequentially driven to perform a pixel writing operation. Alternatively, as described later, the display area 80 may be divided into a plurality of subareas, and the touch detection operation and the pixel writing operation may be performed for each subarea.

Next, the influence of the touch detection operation over the alignment of liquid crystals will be described.

Figure 8:
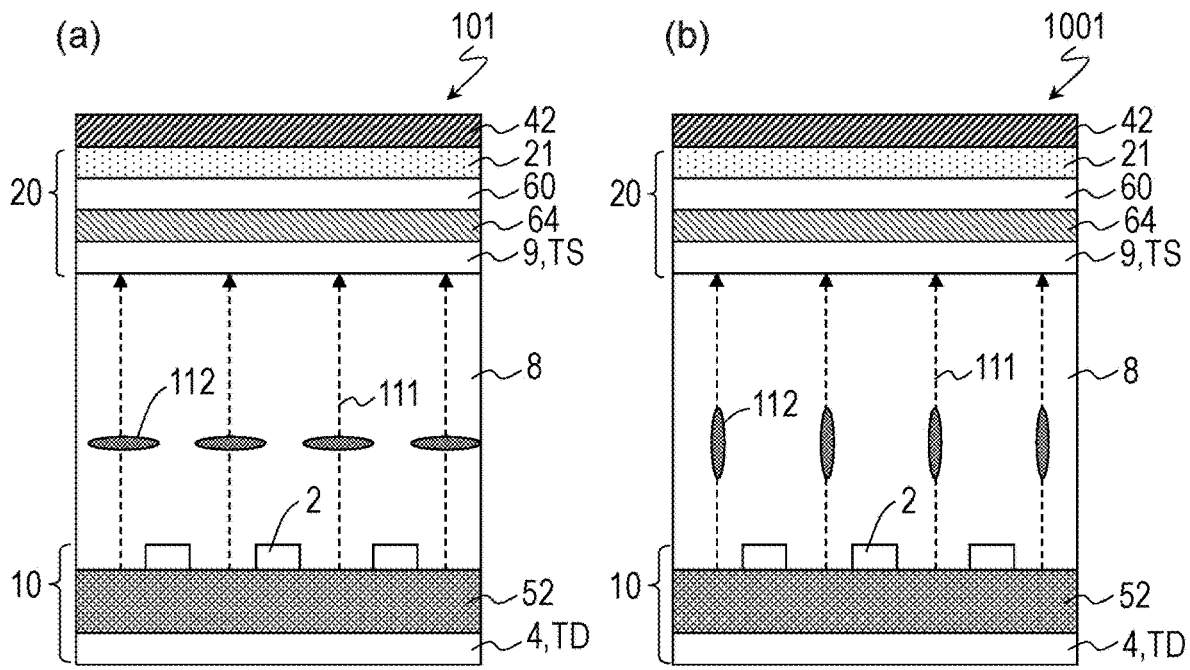
FIG. 8(a) is a sectional view illustrating the alignment of liquid crystals when a touch on the touch panel 101 is detected.
FIG. 8(b) is a sectional view illustrating the alignment of liquid crystals of a touch panel 1001 of a first comparative example including a positive liquid crystal material.

FIG. 8(a) is a sectional view illustrating the alignment of liquid crystals when a touch is detected in the touch panel 101 of the present embodiment. For comparison, the alignment of liquid crystals of a touch panel 1001 of a first comparative example adopting a positive liquid crystal material is shown in FIG. 8(b).

When in the touch detection operation, a scan signal is supplied to the touch scan electrode TD, electric field lines 111 are generated in a thickness direction of the liquid crystal layer 8. At this time, in the touch panel 1001 of the first comparative example adopting the positive liquid crystal material, liquid crystal molecules 112 are aligned to be parallel to the electric field lines 111 as illustrated in FIG. 8(b). Therefore, the refractive index anisotropy of the liquid crystal layer 8 disappears. Thus, a luminance difference results depending on the presence or absence of the scan signal, which may cause display unevenness. In contrast, in the touch panel 101 adopting the positive liquid crystal material, liquid crystal molecules 112 are aligned to be vertical to the electric field lines 111 as illustrated in FIG. 8(a). That is, the liquid crystal molecules 112 maintain an alignment direction (horizontal direction) the same as that in a state where a voltage is not applied to the liquid crystal layer 8. Thus, as compared to a case where positive liquid crystals are adopted, it is possible to reduce luminance variation caused by the electric field line 111, and therefore, a high display quality is obtained.

The Number and Arrangement of Signal Lines for Touch Sensor

The touch panel 101 includes the touch scan lines TDL and the touch detection lines TSL as signal lines for the touch sensor. The touch scan lines TDL may serve also as common lines. For example, each touch scan line TDL may be configured to input a common signal Vcom to the first common electrode portion 4p when pixel writing is performed and to input a drive signal (scan signal) of the touch sensor to the first common electrode portion 4p when touch detection is performed. The common signal Vcom may serve also as the scan signal. The touch detection lines TSL may serve also as common lines. For example, each touch detection lines TSL may be configured to input the common signal Vcom to the second common electrode portion 9p when pixel writing is performed and to output a detection signal from the second common electrode portion 9p when touch detection is performed.

One touch scan line TDL or two or more touch scan lines TDL may be connected to each touch scan electrode TD. Similarly, one touch detection line TSL or two or more touch detection lines TSL may be connected to each touch detection electrode TS.

Figure 9:
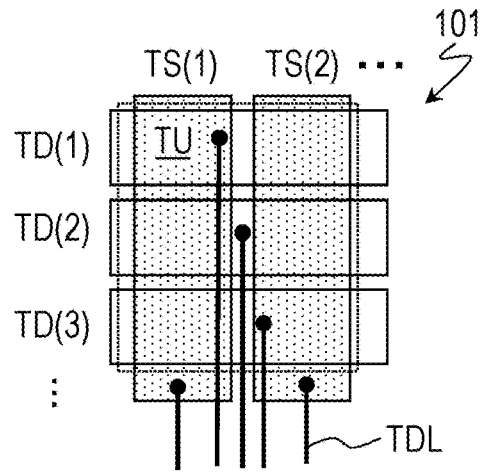
FIG. 9 is a plan view illustrating the number of touch scan lines TDL in the touch panel 101.
Figure 10:
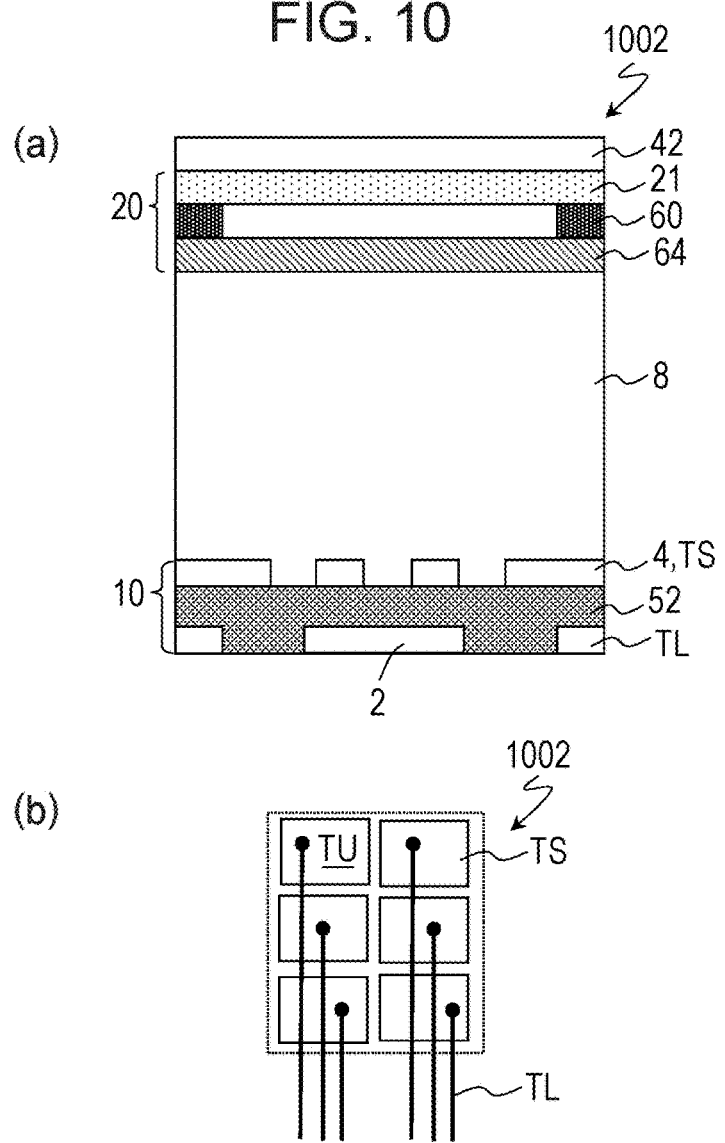
FIGS. 10(a) and 10(b) are respectively a sectional view of a touch panel 1002 of a second comparative example and a view illustrating the number of touch scan lines TDL.

FIG. 9 is a plan view illustrating the number of touch scan lines TDL in the touch panel 101. FIGS. 10(a) and 10(b) are respectively a sectional view and a view illustrating the number of touch scan lines TDL of a touch panel 1002 of a second comparative example.

The touch panel 1002 of the second comparative example is a touch panel in which only one electrode layer for a touch sensor is formed (includes only a touch detection electrode and does not include a touch scan electrode). In the touch panel of the second comparative example, as illustrated in FIGS. 10(a) and 10(b), the first substrate 10 has touch detection electrodes TS separated for each touch detection unit. Each common electrode 4 may serve also as the touch detection electrode TS. Each touch detection electrode TS is connected to a signal line TL. In this configuration, the signal line TL is provided to each touch detection unit TU. For example, when the touch detection units TU are arranged in a matrix form in M rows and N lines, M×N touch detection electrodes TS and signal lines TL have to be provided.

In contrast, in the present embodiment, intersections of the touch scan electrodes TD and the touch detection electrode TS are used as the touch detection units TU. In this way, it is possible to reduce the number of signal lines to be fewer than that of the touch detection units TU.

For example, when the plurality of touch detection units TU are arranged in a matrix form in M rows and N columns, as illustrated in FIG. 9, the touch scan electrode TD (or the touch detection electrode TS) is disposed for each row, and the touch detection electrode TS (or the touch scan electrode TD) is disposed for each column. In this case, the number of signal lines required (the sum of the signal lines TDL connected to the touch scan electrode TD and the signal lines TSL connected to the touch detection electrode TS) is M+N. Thus, it is possible to significantly reduce the number of signal lines as compared to the touch panel 1002 of the second comparative example, and the degree of freedom of layout is increased.

Note that the number of signal lines may be larger than the above-described number (M+N) of the signal lines required. For example, two or more signal lines may be connected to one touch scan electrode TD or one touch detection electrode TS.

Figure 11:
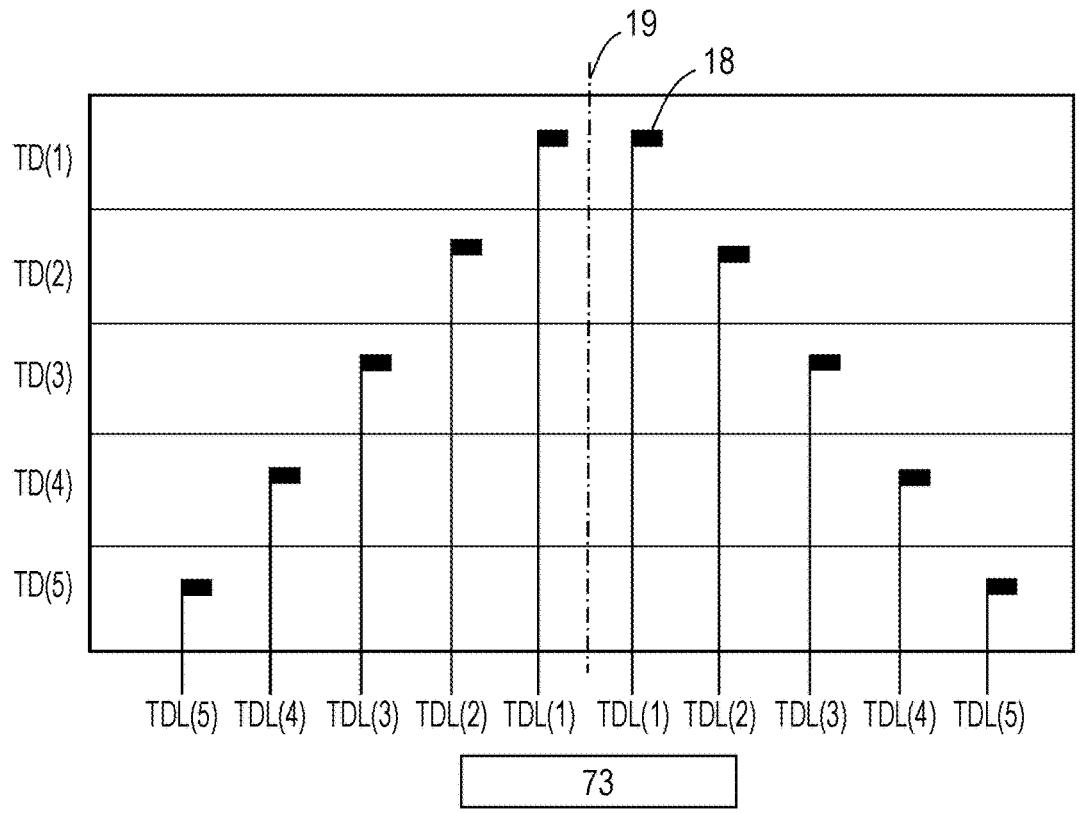
FIGS. 11(a) and (b) are plan views illustrating connection examples between the touch scan electrode TD and the touch scan line TDL in the first substrate 10.
Figure 11:
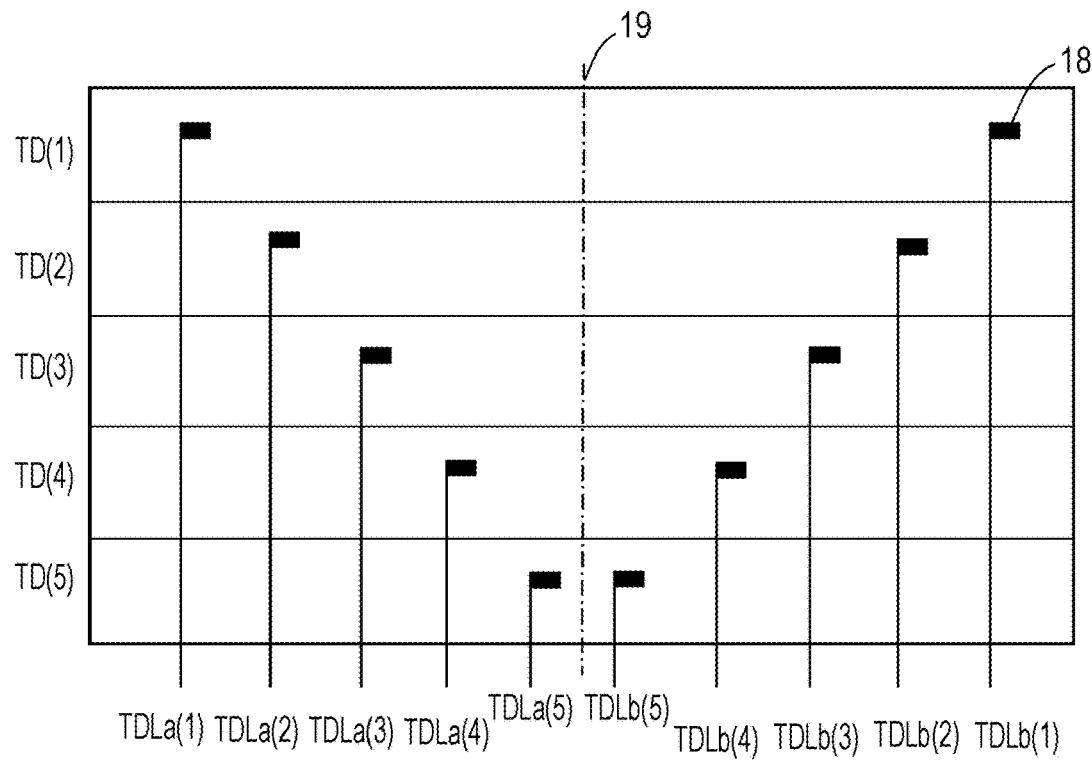

FIGS. 11(*a*) and 11(*b*) are plan views each illustrating an example in which in the first substrate 10, a plurality of (in this example, two) touch scan lines TDL are connected to each first common electrode portion 4*p* serving as the touch scan electrode TD.

When viewed in the normal direction to the first substrate 10, a plurality of (in this example, five) touch scan electrodes TD(1) to TD(5) are arranged in the y direction in the display area 80. The scan driver 73 is disposed in an area 90*y* of the peripheral area 90 located below the display area 80. In a touch scan electrode contact part 18, the touch scan electrodes TD(1) is connected to two touch scan lines TDL(1), the touch scan electrodes TD(2) is connected to two touch scan lines TDL(2), the touch scan electrodes TD(3) is connected to two touch scan lines TDL(3), the touch scan electrodes TD(4) is connected to two touch scan lines TDL(4), and the touch scan electrodes TD(5) is connected to two touch scan lines TDL(5). The touch scan electrodes TD(1) to TD(5) are electrically connected to the scan driver 73 via the touch scan lines TDL(1) to TDL(5). Note that for simplification, five touch scan electrodes are illustrated in this example, but the number of touch scan electrodes is not limited to this example.

Connecting the plurality of touch scan lines TDL to each touch scan electrode TD enables a delay of the common signal and the scan signal to be reduced. As a result, it becomes possible to further increase the touch detection sensitivity. Moreover, Greenish and/or stripe like unevenness is reduced, which enables the display quality to be enhanced. The term "Greenish" refers to a coloring phenomenon resulting from a difference between voltages applied to liquid crystal layers of specific pixels caused due to rounding of the common signal.

The touch scan lines TDL(1) to TDL(5) may be arranged so that the difference among the lengths thereof is as small as possible. Thus, it is possible to reduce a difference between times (delay times) in which the common signal and the scan signal are transmitted to the touch scan electrodes TD, which enables degradation of display performance and touch detection performance to be reduced. For example, as illustrated in FIG. 11(*a*), when the scan driver 73 is disposed in the periphery of a center part of the width of the second peripheral area 90*y* in the x direction, the touch scan lines TDL(1) to TDL(5) may be arranged in the display area 80 such that the touch scan line TDL is closer to a center side as the location of the touch scan electrode TD to which the touch scan line TDL is connected is farther from the scan drive 73.

Alternatively, as illustrated in FIG. 11 (*b*), two scan drivers 73*a* and 73*b* may be arranged on opposing sides of the second peripheral area 90*y*. In this case, one touch scan electrode TD(n) (n: 1 to 5) may be provided with a touch scan line TDLa(n) connected to the scan driver 73*a* and a touch scan line TDLb(n) connected to the scan driver 73*b*.

Also in this example, the touch scan lines TDLa(1) to TDLa(5) and TDLb(1) to TDL(5) may be arranged as indicated below so that the difference among the lengths thereof is as small as possible. That is, the touch scan lines TDLa(1) to TDLa(5) and TDLb(1) to TDL(5) may be arranged in the display area 80 such that the touch scan lines TDLa and TDLb are locate closer to the center side as the location of the touch scan electrodes TD to which the touch scan lines TDLa and TDLb are connected is closer to the scan drives 73*a* and 73*b* respectively.

Moreover, as illustrated in FIGS. 11(*a*) and 11(*b*), when viewed in the normal direction to the first substrate 10, the plurality of touch scan electrode contact parts 18 are preferably disposed to be substantially line symmetric about a line 19 extending across the display area 80 in the y direction. That is, distances from the two touch scan electrode contact parts 18 to the line 19 in each touch scan electrode TD(n) are preferably equal to each other. The line 19 may be, for example, a centerline dividing the display area 80 into two equal parts in the y direction. This enables distances from the scan driver 73 to the touch scan electrodes TD(1) to TD(5) to be further equalized to reduce resistance difference without increasing the size of the second peripheral area 90*y* (in particular, the interval between the display area 80 and the scan driver 73).

Variations

Next, variations of the touch panel of the present embodiment will be described. In the following description, differences from the touch panel 101 will be mainly described for each variation, and description that overlaps the description of the touch panel 101 will be omitted.

Figure 12:
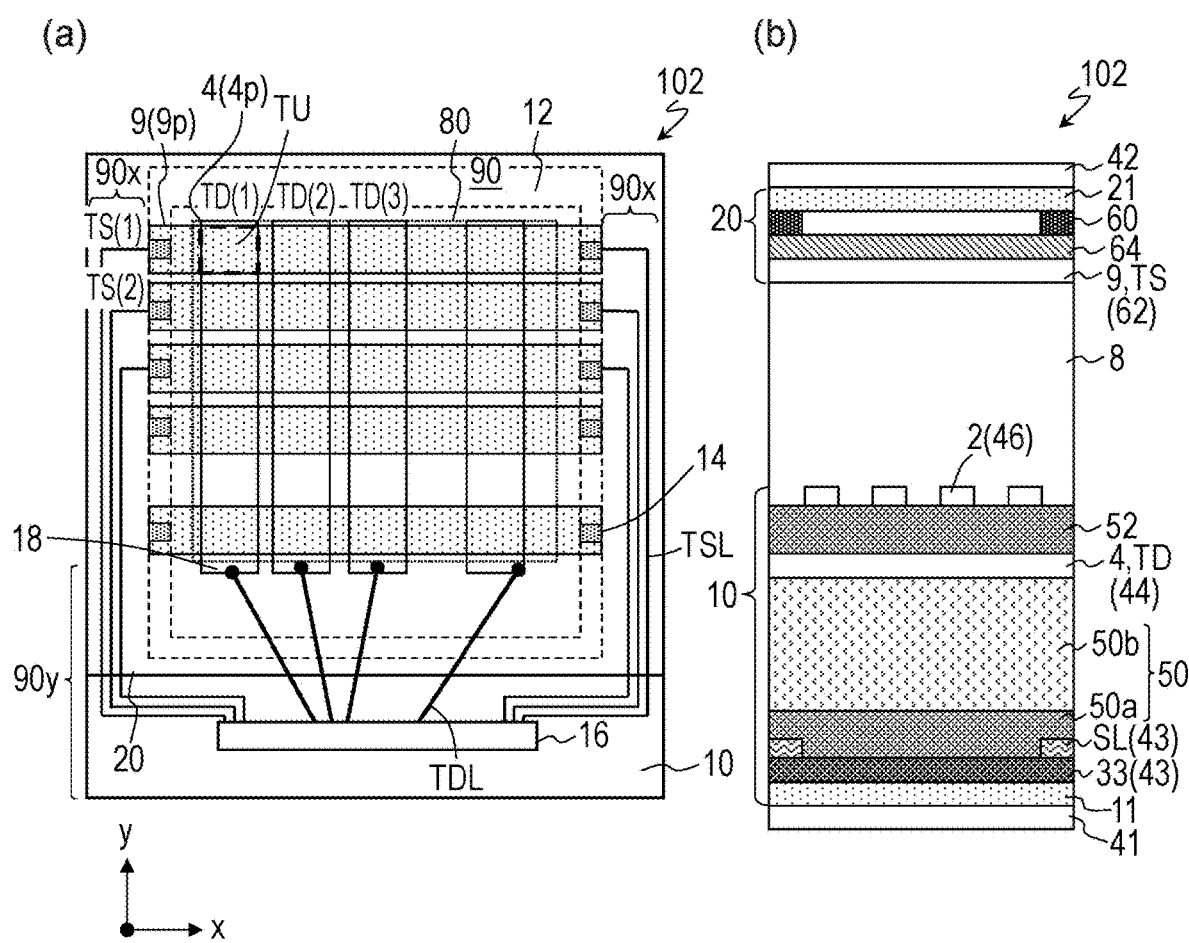
FIG. 12(a) is a plan view illustrating another touch panel 102 of the first embodiment.
FIG. 12(b) is a sectional view illustrating a pixel structure in the touch panel 102.

FIG. 12(*a*) is a plan view illustrating another touch panel 102 of the present embodiment, and FIG. 12(*b*) is a sectional view illustrating a pixel structure of the touch panel 102.

In the touch panel 102, similar to the previously described touch panel 101, first common electrode portions 4*p* formed on a first substrate 10 serve also as touch scan electrodes TD, and second common electrode portions 9*p* formed on a second substrate 20 serve also as touch detection electrodes TS. Note that the touch panel 102 is different from the touch panel 101 in that the first common electrode portions 4*p* extend in the y direction, and the second common electrode portions 9*p* extend in the x direction.

Each first common electrode portion 4*p* extends across a display area 80 in the y direction and is connected to a touch scan line TDL in a second peripheral area 90*y*. The touch scan line TDL is connected to, for example, a scan driver on a semiconductor chip 16. In a peripheral area 90 (here, the second peripheral area 90*y*), each touch scan line TDL is connected to the scan driver and a scan-driver-side end of the first common electrode portion 4*p*. Thus, in the touch panel 102, the touch scan lines TDL are disposed only in the peripheral area 90 and are not disposed in the display area 80 (in the pixel). Thus, it is possible to increase a pixel aperture ratio as compared to a case where part of each touch scan line TDL is disposed in the pixel.

On the other hand, each second common electrode portion 9*p* extends across the display area 80 in the x direction, and in first peripheral areas 90*x* on both sides of the display area 80, each second common electrode portion 9*p* is connected via contact columns 14 to touch detection lines TSL formed on the first substrate 10. The touch detection lines TSL are connected to a detection driver. In this example, each touch detection line TSL extends in the first peripheral area 90*x* and is connected to the detection driver disposed on, for example, the semiconductor chip 16 in the second peripheral area 90*y*.

Figure 13:
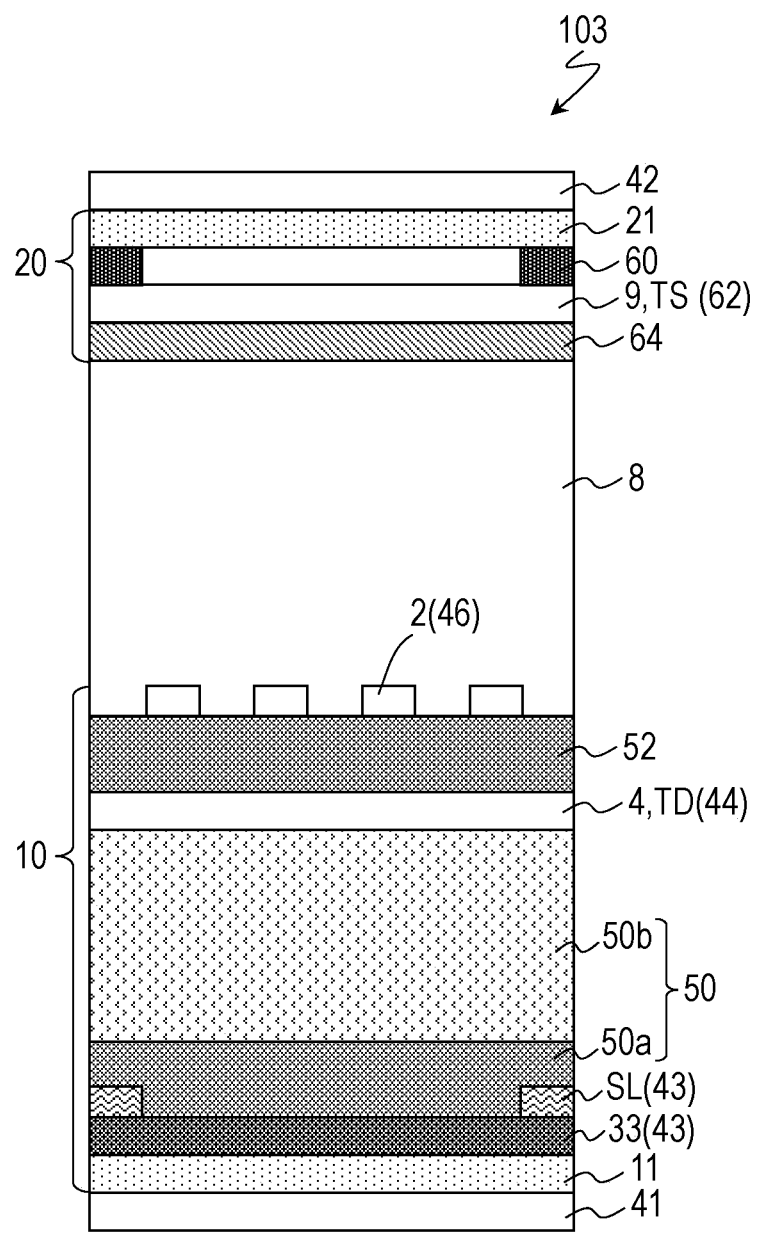
FIG. 13 is a sectional view illustrating a pixel structure in another touch panel 103 of the first embodiment.

FIG. 13 is a sectional view illustrating a pixel structure in another touch panel 103 of the present embodiment.

The touch panel 103 is different from the touch panel 101 in that an overcoat layer 64 is disposed in a second substrate 20 on a side of the second common electrode 9 facing a liquid crystal layer 8. Note that another overcoat layer may further be provided between a color filter layer 60 and the second common electrode 9.

In the touch panel 103, the overcoat layer 64 is located between each touch detection electrode TS and each touch scan electrode TD. Thus, a scan voltage applied between the touch detection electrode TS and the touch scan electrode TD is also applied to the overcoat layer 64, and therefore, it is possible to reduce a voltage applied to the liquid crystal layer 8. This enables the influence of the AC drive by the touch scan electrode TD over liquid crystals to be reduced, and therefore, it is possible to improve low-quality display (for example, stripe-like display unevenness) when touch detection is performed.

Figure 14:
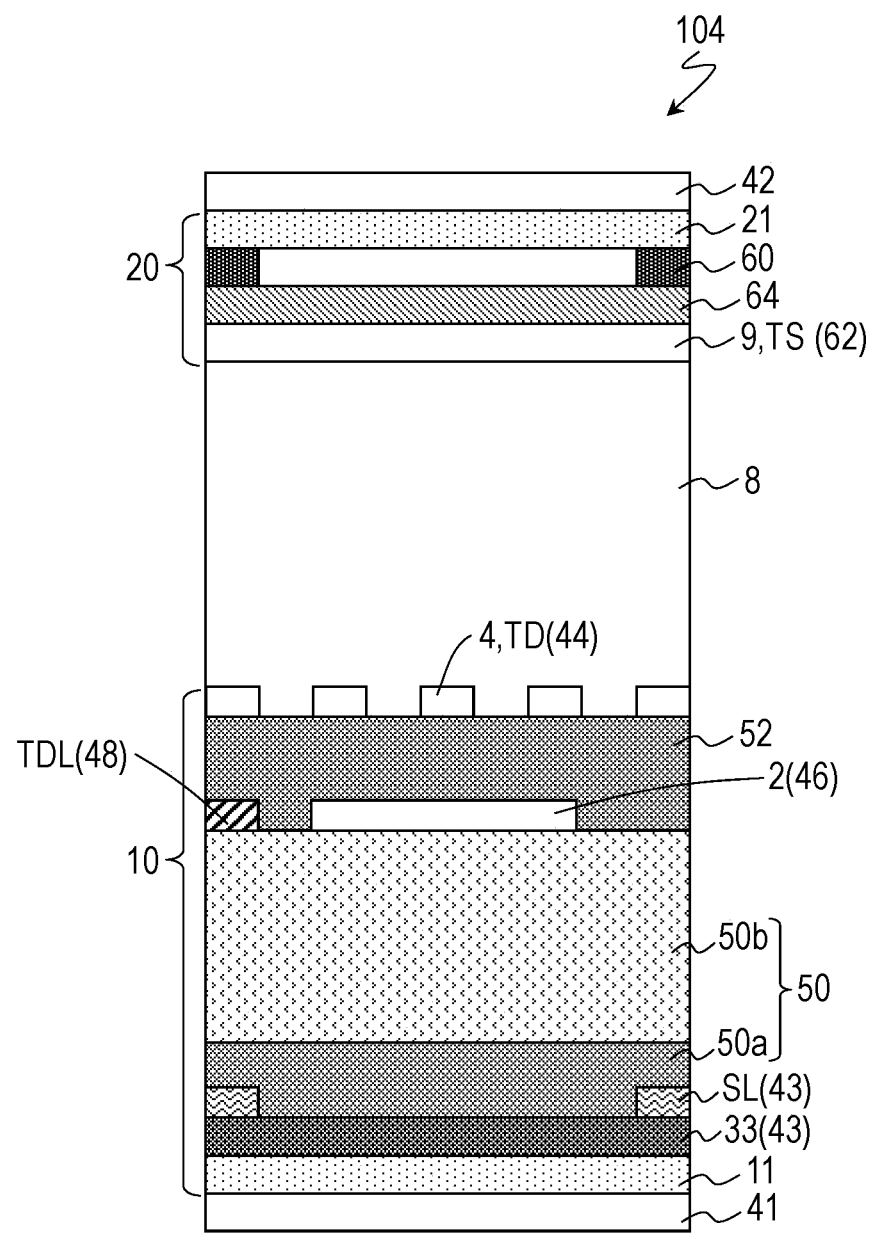
FIG. 14 is a sectional view illustrating a pixel structure in another touch panel 104 of the first embodiment.

FIG. 14 is a sectional view illustrating a pixel structure in another touch panel 104 of the present embodiment.

The touch panel 104 is different from the touch panel 101 in that a first substrate 10 includes a first common electrode 4 disposed between each pixel electrode 2 and a liquid crystal layer 8. In this example, the pixel electrodes 2 and touch scan lines TDL are formed on a first insulating layer 50. The first common electrode 4 is formed on a second insulating layer 52 on the pixel electrodes 2 and the touch scan lines TDL. The first common electrode 4 is separated for each touch detection unit to serve as a touch scan electrode TD. In addition, the first common electrode 4 has a slit or a cutout for each pixel. On the other hand, the pixel electrode 2 is at least separated for each pixel, and does not have to have a slit or the like.

In the touch panel 104, it is possible to arrange the touch scan electrode TD close to a touch detection electrode TS (second common electrode 9) as compared to the touch panel 101. This enables the interval between the touch scan electrode TD and the touch detection electrode TS to be further reduced, and therefore, it is possible to more directly transmit a scan signal to the touch detection electrode TS. Thus, it becomes possible to further enhance touch detection sensitivity.

Figure 15:
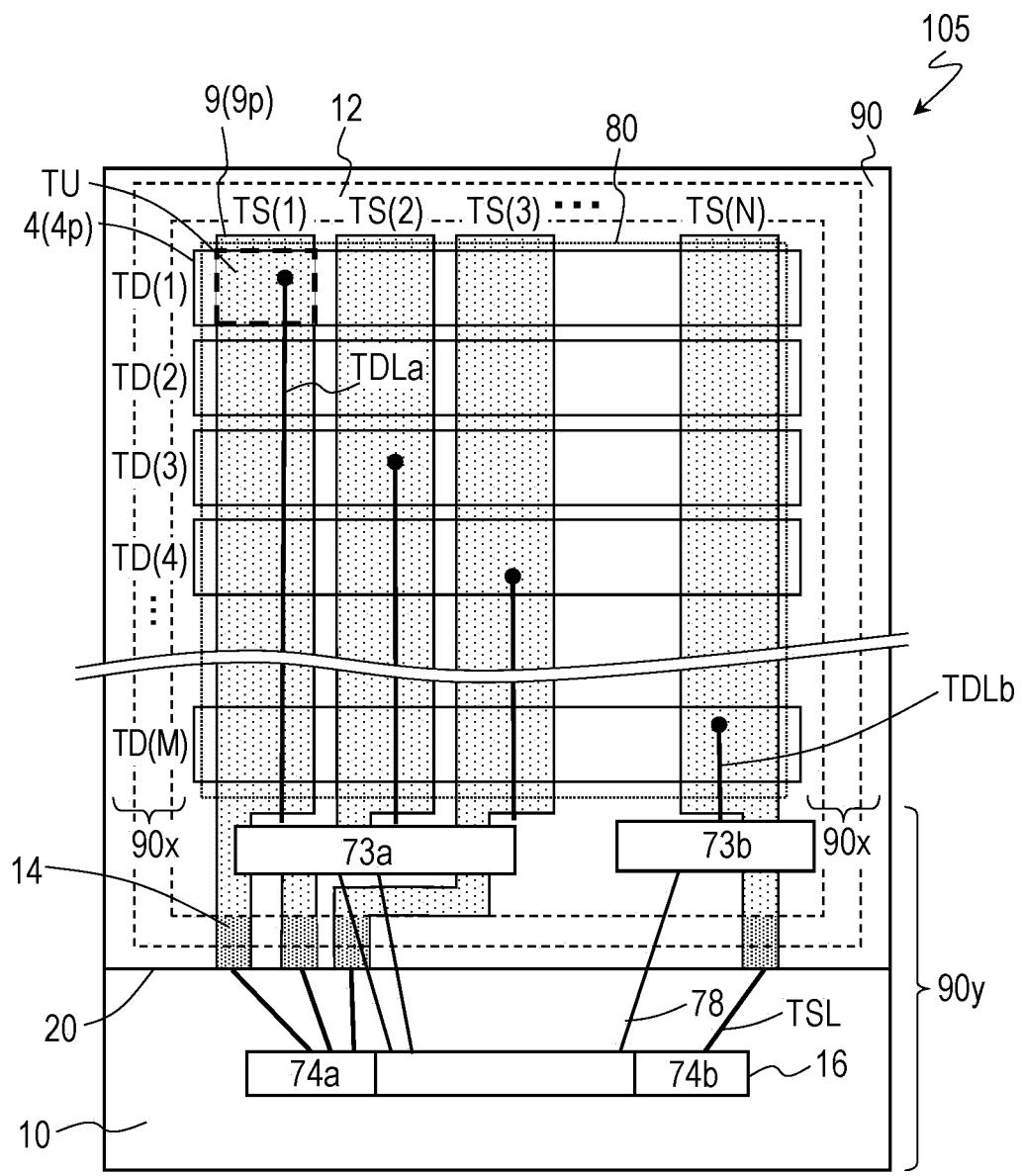
FIG. 15 is a plan view illustrating another touch panel 105 of the first embodiment.

FIG. 15 is a plan view illustrating another touch panel 105 of the present embodiment.

The touch panel 105 is different from the touch panel 101 in that a scan driver 73 is monolithically formed with a first substrate 10.

Monolithically forming the scan driver 73 reduces cost of a semiconductor chip 16 as compared to a case where the scan driver 73 is disposed on the semiconductor chip 16. Moreover, the scan driver 73 is satisfactorily driven by signal lines 78 (for example, a clock line, a start signal line, and a constant potential line) the number of which is smaller than the number of touch scan lines TDL. This enables the number of lines from the semiconductor chip 16 to be reduced, and thus it is possible to narrow the peripheral area 90.

In the touch panel 105, two scan drivers 73a and 73b (hereinafter referred to as "scan drivers 73" in some cases) are disposed with an interval therebetween in a second peripheral area 90y. Note that the number of scan drivers 73 may be one or three or more.

The scan drivers 73 can be preferably disposed between the display area 80 and the semiconductor chip 16. In this example, when the first substrate 10 is viewed in the normal direction, the scan driver 73 is disposed in an area which is surrounded by the sealing material 12 and which is located below the display area 80.

As illustrated in the figure, the scan drivers 73a and 73b may be disposed on opposing sides of a source signal lead line connecting a source driver and a source line SL in the second peripheral area 90y. The scan drivers 73a and 73b are connected, via touch scan lines TDLa and TDLb, to respective touch scan electrodes TD. Each of the touch scan lines TDLa and TDLb may be located in the display area 80 (in a pixel) and may have a part extending across a pixel column.

Note that disposition of other drivers is not particularly limited, but, for example, the gate driver (not shown) may be monolithically formed in a first peripheral area 90x, and the source driver and detection drivers 74a and 74b may be provided to the semiconductor chip 16.

Second Embodiment

In a touch panel of a second embodiment, a TFT substrate is located closer to an observer side than a counter substrate is, and a touch surface is disposed on a side of the TFT substrate. Thus, the second embodiment is different from the first embodiment in that a detection electrode is disposed on the side of the TFT substrate, and a scan electrode is disposed on a side of the counter substrate.

Figure 7:
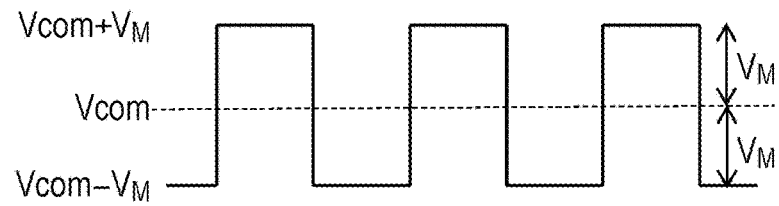
FIGS. 7(a) and 7(b) are views illustrating a waveform respectively of a scan signal input to touch scan electrode TD and a detection signal output from a touch detection electrode TS.
Figure 7:
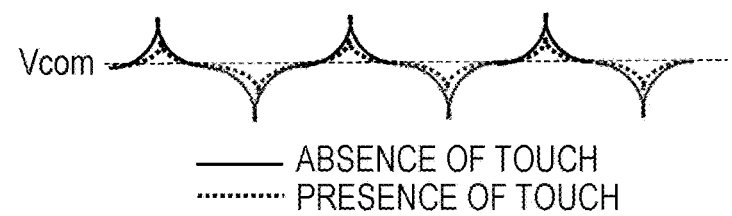

A potential change of the detection electrode is smaller than a potential change of the scan electrode (see FIG. 7). In the present embodiment, the detection electrode is disposed on the TFT substrate, and therefore, coupling capacitance of the detection electrode and the pixel electrode is larger than in a case where the scan electrode is disposed on the TFT substrate. This reduces a potential difference between the detection electrode and the pixel electrode when touch detection is performed. Therefore, influence over display quality is reduced.

Figure 16:
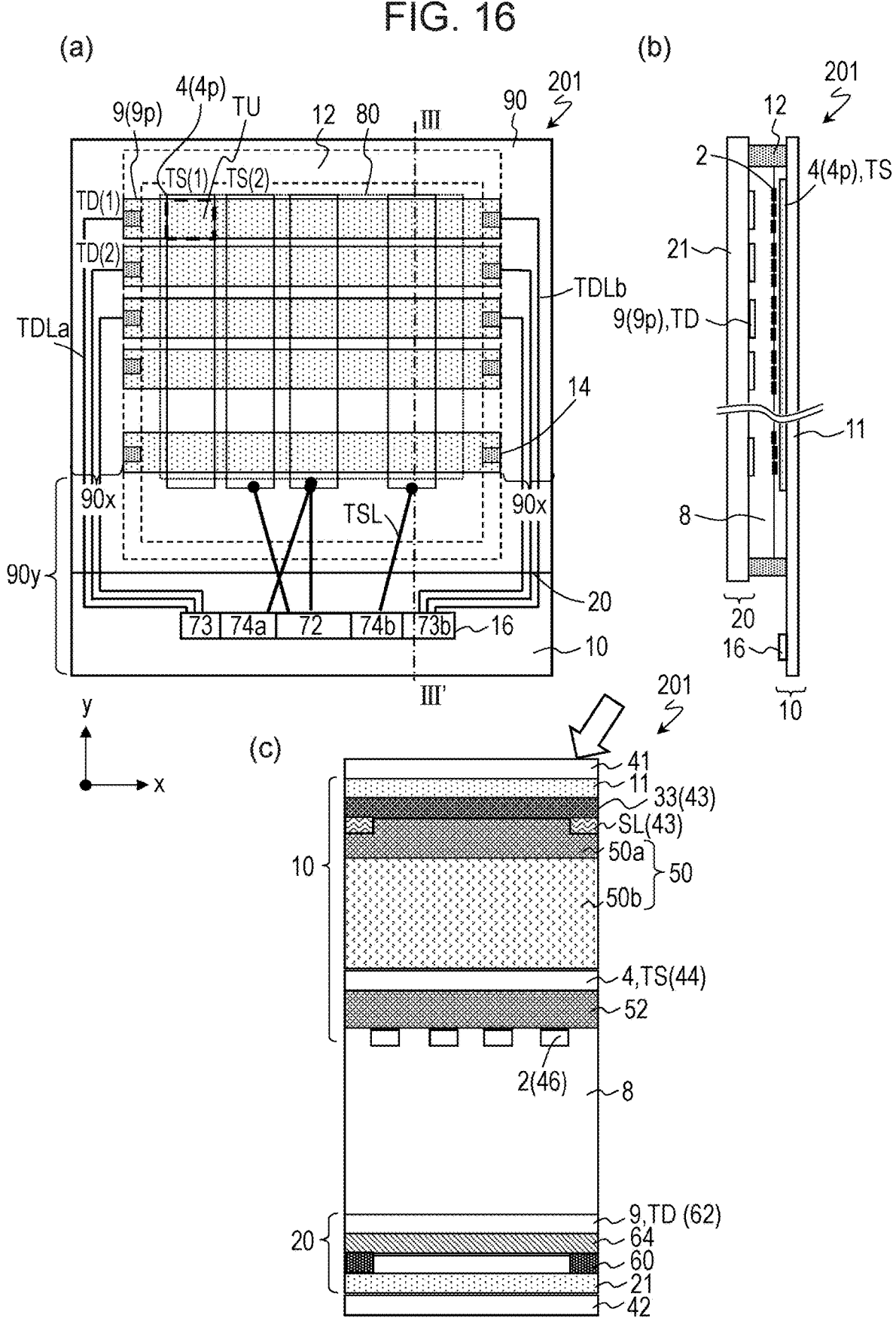
FIGS. 16(a) and 16(b) are respectively a plan view and a sectional view illustrating a touch panel 201 of a second embodiment.
FIG. 16(c) is a sectional view illustrating a pixel structure of the touch panel 201.

FIG. 16(a) is a plan view illustrating a touch panel 201 of the second embodiment. FIG. 16(b) is a sectional view taken along line III-III' of FIG. 16(a). FIG. 16(c) is a sectional view illustrating a pixel structure in the touch panel 201. In FIG. 16, components similar to those in the touch panel 101 are denoted by the same reference signs. In the following description, differences from the touch panel 101 will be mainly described, and overlapping description will be omitted.

In the touch panel 201, a first substrate 10 is located closer to an observer side than a second substrate 20 serving as a counter substrate is, and a side of the first substrate 10 is a touch surface. A first common electrode 4 in the first substrate 10 is separated into a plurality of first common electrode portions 4p to serve also as touch detection electrodes TS. Moreover, a second common electrode 9 in the second substrate 20 is separated into a plurality of second common electrode portions 9p to serve also as touch scan electrodes TD.

Each of the first common electrode portions 4p may extend across the display area 80 in the y direction. In this case, each of the first common electrode portions 4p is electrically connected to a detection driver disposed in, for example, a second peripheral area 90y via a touch detection line TSL. This enables the touch detection line TSL to be disposed only in a peripheral area 90, and therefore, it is possible to suppress a reduction of an aperture ratio caused by signal lines of the touch panel located in a pixel.

On the other hand, each of the second common electrode portions 9p may extend across the display area 80 in the x direction. In this case, each of the second common electrode portions 9p may be connected to a touch scan line TDL on the first substrate 10 via a contact column 14 in a first peripheral area 90x. The touch scan line TDL may extend from, for example, the first peripheral area 90x to the second peripheral area 90y and may be electrically connected to a scan driver disposed in the second peripheral area 90y.

As illustrated in the figure, the touch panel 201 may include two scan drivers 73a and 73b, each first common electrode portion 4p may be connected to the two scan drivers 73a and 73b. For example, a left end of each first common electrode portion 4p may be connected to the scan driver 73a via a touch scan line TDLa, and a right end of each first common electrode portion 4p may be connected to the scan driver 73b via a touch scan line TDLb. Thus, as previously described with reference to FIG. 11, it is possible to reduce delays of a common signal and a scan signal.

Figure 17:
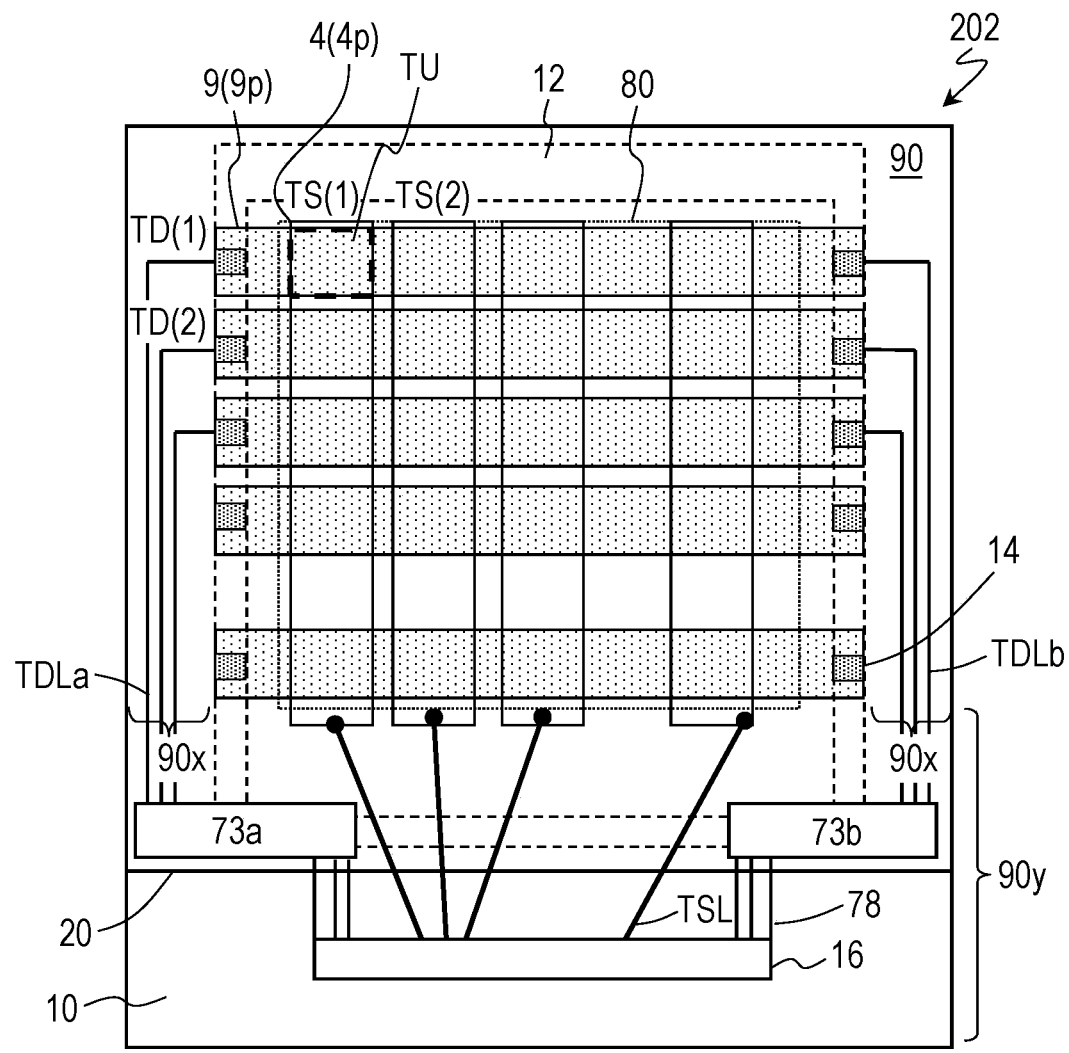
FIG. 17 is a plan view illustrating another touch panel 202 of the second embodiment.
Figure 18:
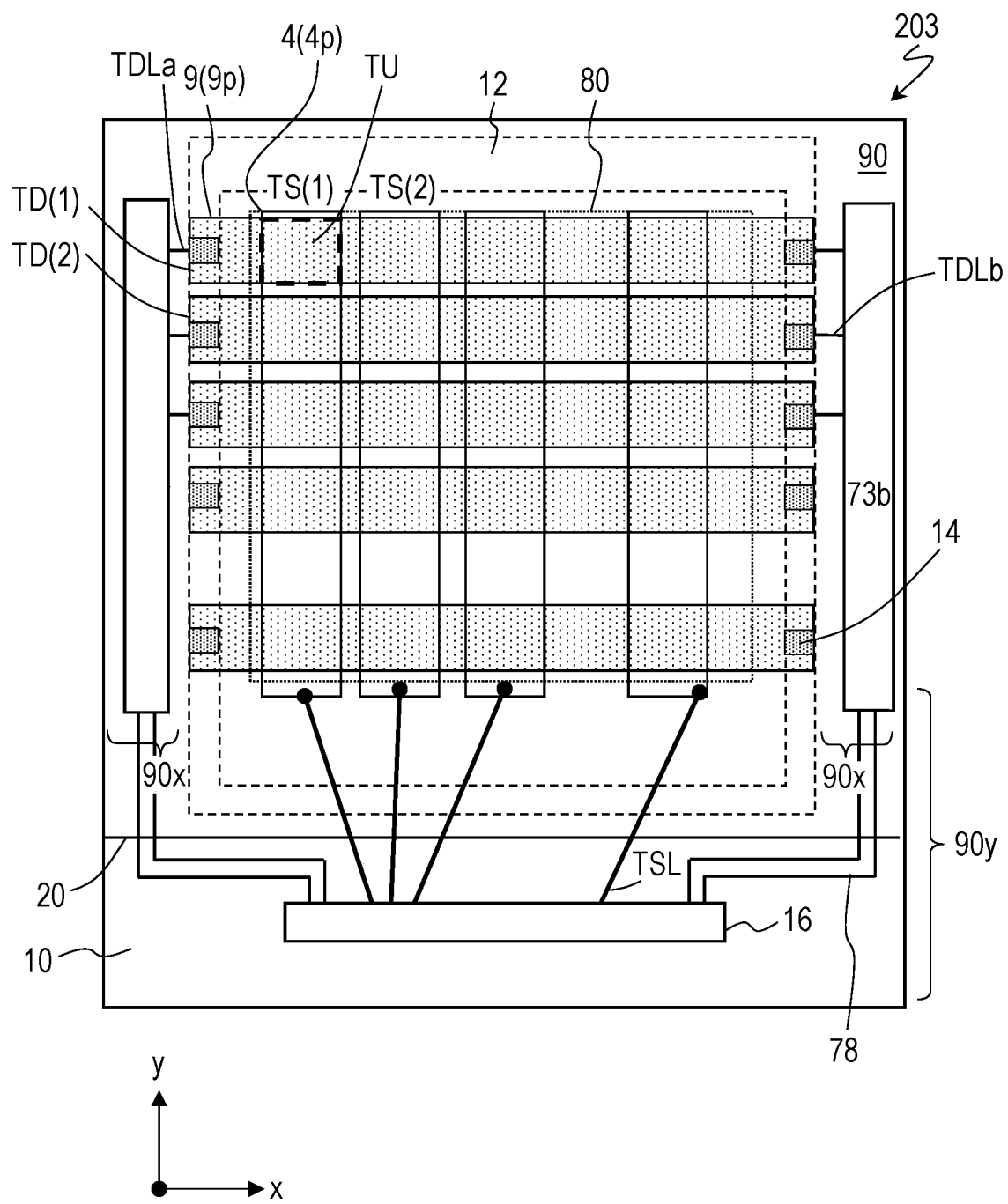
FIG. 18 is a plan view illustrating another touch panel 203 of the second embodiment.

FIGS. 17 and 18 are plan views respectively illustrating other touch panels 202 and 203 of the second embodiment. In these examples, a scan driver 73 is monolithically disposed on the first substrate 10. Thus, it is possible to reduce cost of a semiconductor chip 16. Moreover, this enables the number of lines from the semiconductor chip 16 to be reduced, and thus it is possible to narrow the peripheral area 90.

In the touch panel 202 shown in FIG. 17, two scan drivers 73a and 73b (hereinafter referred to as "scan drivers 73" in some cases) are monolithically formed in a second peripheral area 90y. Note that the number of scan drivers 73 may be one or three or more. The scan drivers 73 may be disposed between the display area 80 and the semiconductor chip 16 in the second peripheral area 90y.

In this example, the scan drivers 73a and 73b are disposed with an interval therebetween. The scan drivers 73a and 73b may be disposed on opposing sides of a source signal lead line connecting a source driver 72 and a source line SL to each other in the second peripheral area 90y. when viewed in the normal direction to the first substrate 10, the scan drivers 73a and 73b are preferably disposed in the periphery of a right edge and a left edge of the second peripheral area 90y (for example, below the first peripheral area 90x). Thus, it is possible to reduce the length of the touch scan line TDL. The locations of the scan drivers 73a and 73b are not particularly limited, but the entirety thereof is preferably disposed in a sealing material 12. Thus, it is possible to reduce influence of external foreign articles, charges, or the like over TFTs included in the scan drivers 73a and 73b, and thus, it is possible to secure a higher reliability. Note that the scan drivers 73a and 73b may be disposed outside the sealing material 12. Alternatively, only part of the scan drivers 73a and 73b may be disposed inside the sealing material 12. In this case, the scan drivers 73a and 73b may overlap the sealing material 12. As illustrated in the figures, the scan drivers 73a and 73b may extend across the sealing material 12 in the x direction to the outside of the sealing material 12.

In this example, each second common electrode portion 9p (touch scan electrode TD) formed in the second substrate 20 extends in the x direction and is connected to touch scan lines TDLa and TDLb in the first substrate 10 via contact columns 14 in the first peripheral area 90x. The touch scan lines TDLa and TDLb extend in the first peripheral area 90x toward the second peripheral area 90y and are connected to the scan drivers 73a and 73b. Each of the second common electrode portions 9p may be connected to the two scan drivers 73a and 73b. For example, a left end of each second common electrode portion 9p may be connected to the scan driver 73a via a touch scan line TDLa, and a right end of each second common electrode portion 9p may be connected to the scan driver 73b via a touch scan line TDLb.

The touch panel 203 illustrated in FIG. 18 includes the scan driver 73 monolithically formed with a first peripheral area 90x. For example, two scan drivers 73a and 73b may be disposed in first peripheral areas 90x respectively located on the right and the left of a display area 80.

In the touch panel 203, each second common electrode portion 9p formed in a second substrate 20 extends in the x direction to the first peripheral area 90x, and in the first peripheral area 90x, each second common electrode portion 9p is connected to the scan drivers 73a and 73b via contact columns 14 and touch scan lines TDLa and TDLb. This enables the contact columns 14 and the scan drivers 73 to be disposed closer to each other, and therefore, it is possible to reduce a region in which the touch scan lines TDL are to be formed. Thus, it is possible to further narrow the first peripheral area 90x. Also in this example, each second common electrode portion 9p may be connected to the two scan drivers 73a and 73b.

Figure 19:
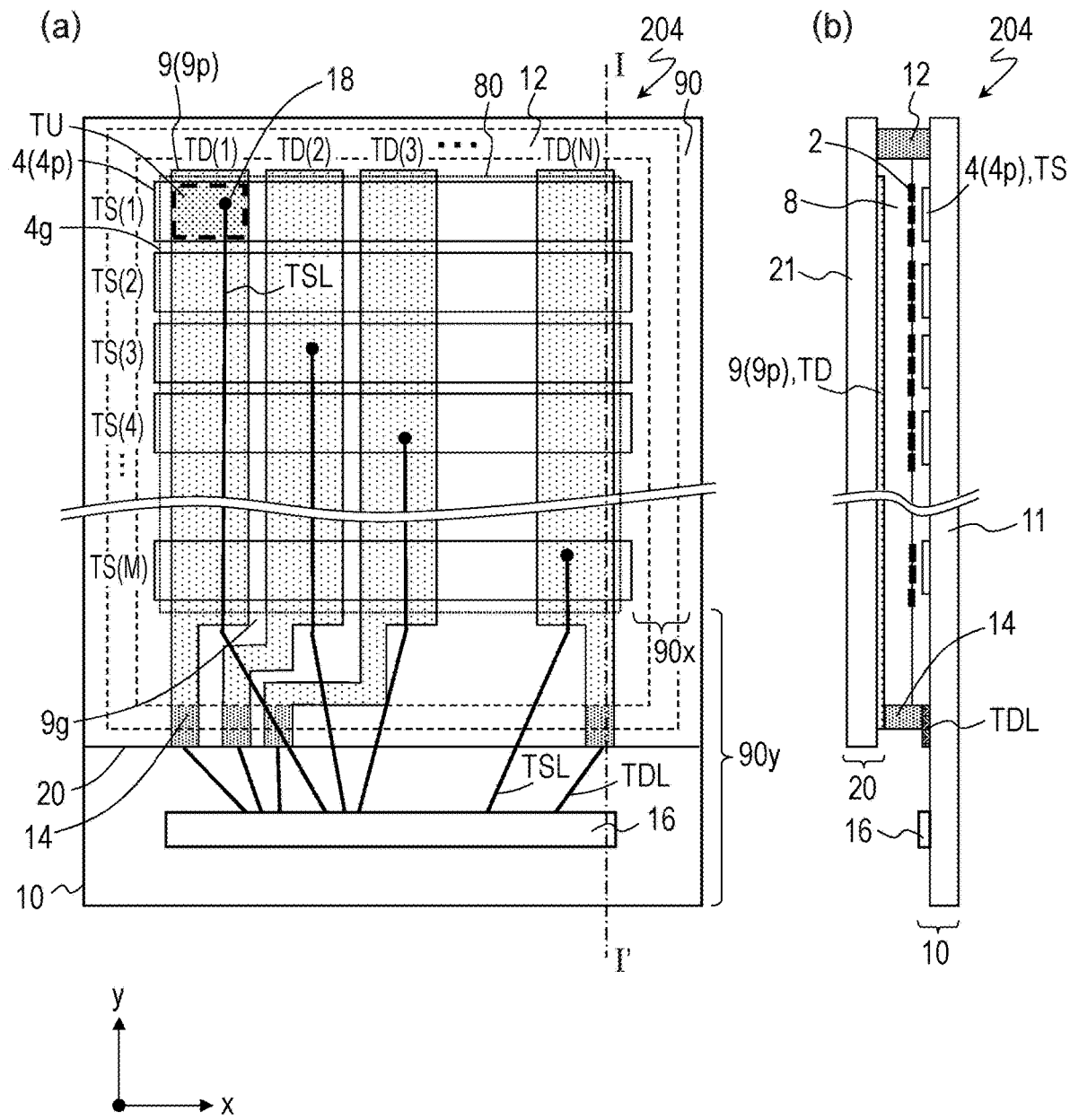
FIGS. 19(a) and 19(b) are respectively a plan view and a sectional view illustrating another touch panel 204 of the second embodiment.

The structure of the touch panel of the present embodiment is not limited to the examples shown in FIGS. 16 to 18. When modification is made such that the first common electrode 4 serves also as the touch detection electrode TS, and the second common electrode 9 also serves as the touch scan electrode TD, various types of variations described in the first embodiment is applicable. The order of stacked layers in each of the first substrate 10 and the second substrate 20 may be changed. Alternatively, as illustrated in FIG. 19, directions in which the touch detection electrode TS and the touch scan electrode TD extend may be changed.

Third Embodiment

A touch panel according to a third embodiment is configured to divide a display area 80 into a plurality of subareas and to perform a touch detection operation and a pixel writing operation on each subarea.

The structure of the touch panel of the present embodiment may be similar to the touch panels 101 to 105, 201 to 203 of the first embodiment and second embodiment previously described. Note that in the present embodiment, as illustrated in FIGS. 1, 16, and the like, touch scan electrodes TD preferably extend in the same direction (x direction) as gate lines GL.

In the present embodiment, a control circuit 76 controls an operation of each driver to perform the following drive during one picture writing time (one vertical scanning period or one frame). The display area is divided into a plurality of subareas, and the touch detection operation is performed on a selected one of the subareas with a writing operation of pixel potential (hereinafter referred to as a "pixel writing operation") being stopped. Then, the writing operation of the pixel is performed with the touch detection operation being stopped. Subsequently, a next subarea is selected, and similarly, a touch detection operation and a writing operation of a pixel are performed. In this way, a touch detection operation and a writing operation of a pixel are sequentially performed on a plurality of subareas.

After a touch detection operation is performed on the subarea selected, a writing operation of a pixel is performed. Therefore, alignment disturbance of liquid crystals due to a potential change when touch detection is performed (in this example, stripes can be generated in the lateral direction in a subarea unit) is less likely to be visually perceived. This provides better transmission performance. The pixel writing operation is preferably performed as soon as (for example, within 1 μsec) after the touch detection operation.

With reference to the drawings, a drive method of the present embodiment will be more specifically described below.

FIGS. 20(a) to 20(d) are schematic plan views illustrating a drive method.

As illustrated in the drawings, the display area 80 is divided in the x direction into a plurality of subareas B. Each subarea B includes one or two or more touch detection units. Here, the display area 80 is divided into n subareas B1 to Bn. The subareas B1 to Bn are arranged from above in the y direction. Each subarea B is disposed to correspond to, for example, one touch scan electrode TD (that is, one touch detection unit row). Note that each subarea B may correspond to two or more touch detection unit rows.

In the drive method of the present embodiment, one subarea B (in this embodiment, the subarea B1) of the plurality of subareas B is first selected. In the present specification, the subarea B selected is referred to as a selected subarea B(Y).

Figure 20:
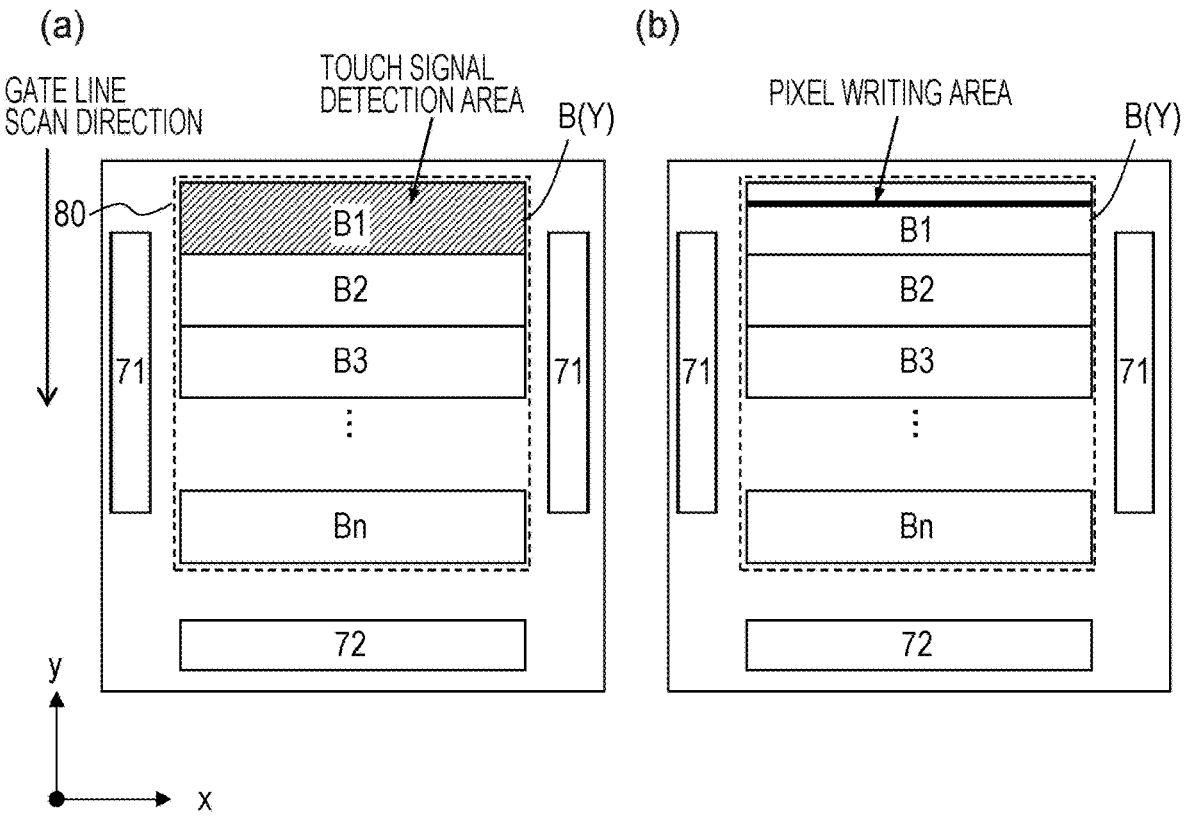
FIGS. 20(a) to 20(d) are schematic plan views illustrating a drive method.
Figure 20:
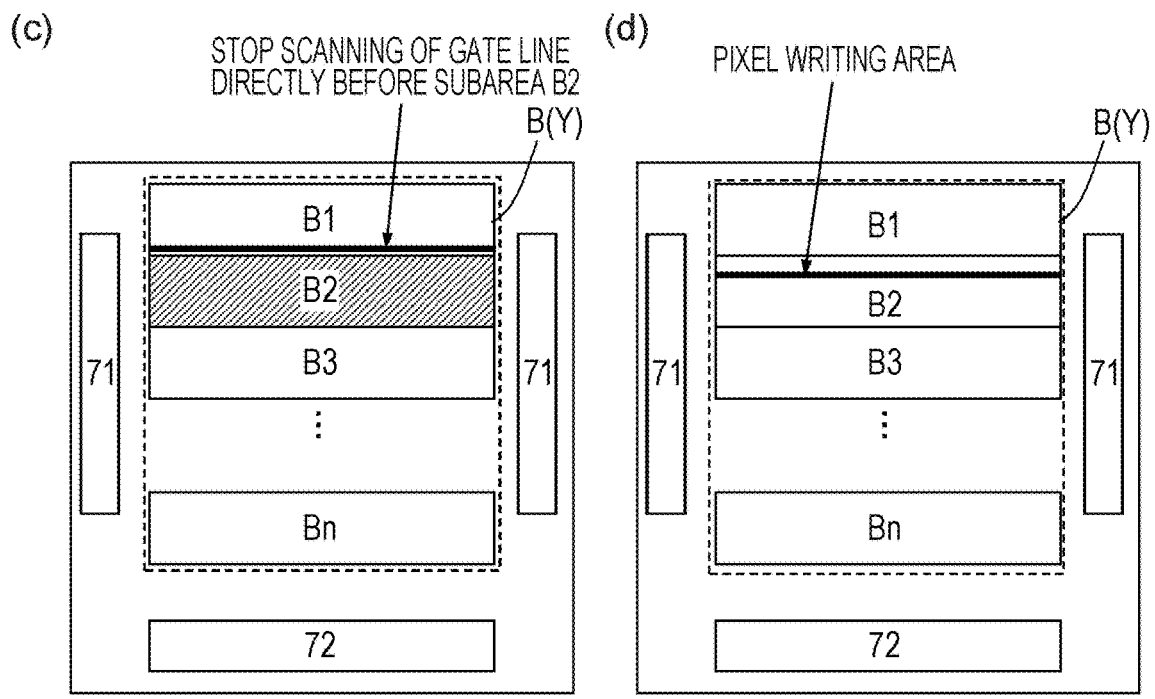

Next, as illustrated in FIG. 20(a), a touch detection operation (a touch detection step) is performed for the selected subarea B(Y) in a state where a pixel writing operation is stopped. The selected subarea B(Y) is a touch signal detection area.

Subsequently, when a touch detection step of the selected subarea B(Y) finishes, as illustrated in FIG. 20(b), a pixel writing operation (pixel writing step) is performed for the selected subarea B(Y) with the touch detection operation being stopped. In this step, a plurality of gate lines located in the selected subarea B(Y) are sequentially driven along the scan direction. Thus, as illustrated in figures, a pixel writing area moves in the selected subarea B(Y) along the scan direction.

When pixel writing in the selected subarea B(Y) finishes, a next subarea B (here, subarea B2) is selected.

Thereafter, as illustrated in FIG. 20(c), scanning of the gate line is stopped immediately before a next selected subarea B(Y), and a touch detection step as described above is performed with the pixel writing operation being stopped. Subsequently, as illustrated in FIG. 20(d), a pixel writing step as described above is performed for the selected subarea B(Y).

In this way, the touch detection step and the pixel writing step are repeated for all the subareas B. When the pixel writing step of the last subarea B(n) finishes, writing of one picture finishes.

Figure 21:
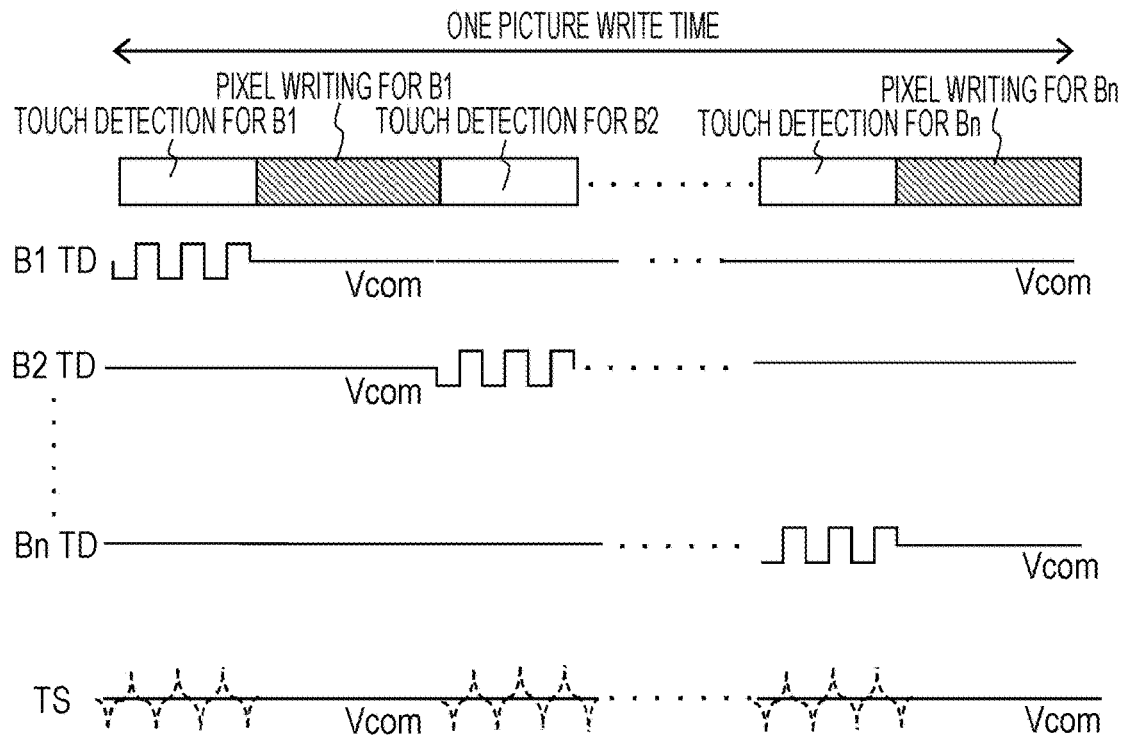
FIG. 21 is a view illustrating an example of a signal waveform of a touch scan electrode TD and a touch detection electrode TS in a touch detection step and a pixel writing step.
Figure 22:
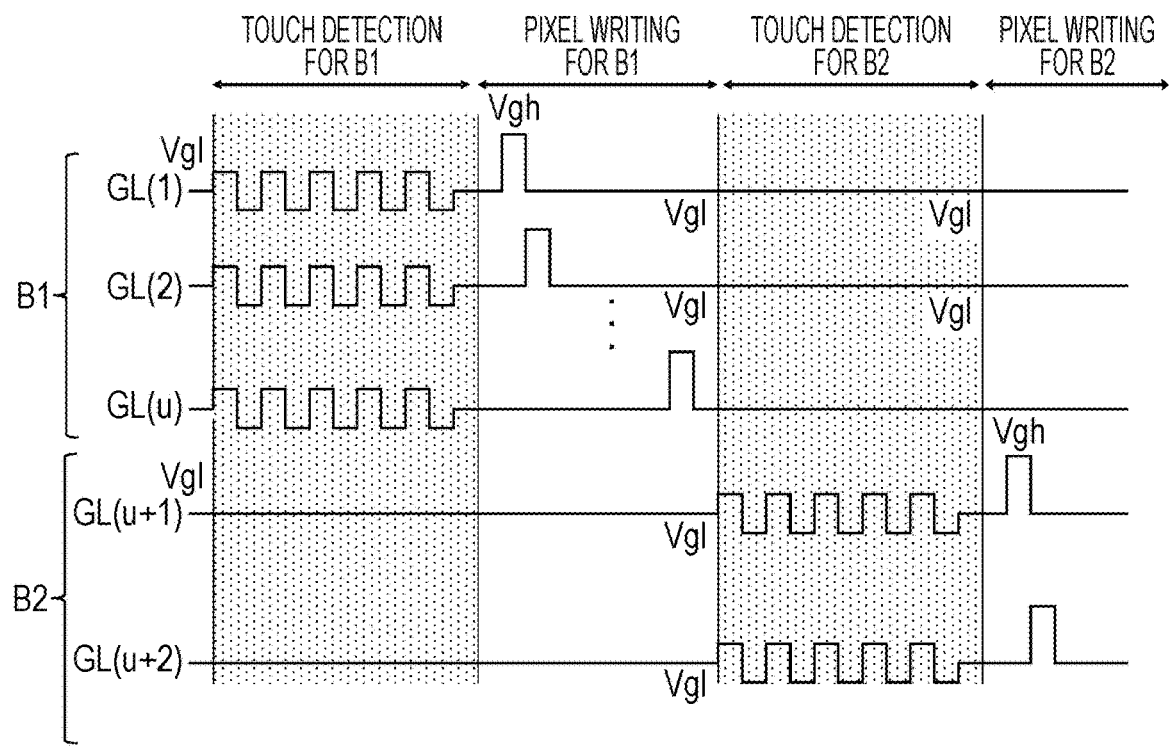
FIG. 22 is a view illustrating an example of a signal waveform of a gate line GL in the touch detection step and the pixel writing step.

FIG. 21 is a view illustrating an example of a signal waveform of a touch scan electrode TD and a touch detection electrode TS in the touch detection step and the pixel writing step. FIG. 22 is a view illustrating an example of a signal waveform of the gate line GL in the touch detection step and the pixel writing step.

Touch Detection Step

As illustrated in FIG. 21, in the touch detection step, a scan signal is input to the touch scan electrode (hereinafter referred to as "selected touch scan electrode") disposed in the selected subarea B(Y) to cause AC drive. On the other hand, a common signal Vcom is input to a touch detection electrode (hereinafter referred to as a "selected touch detection electrode") disposed in the selected subarea B(Y). The selected touch detection electrode TS is affected by an upthrust and a downthrust due to an influence of the scan signal, and thus, the waveform of the selected touch detection electrode TS is a waveform reflecting the scan signal. As previously described, the waveform of the selected touch detection electrode TS changes depending on the presence or absence of a touch. Thus, it is possible to detect the presence or absence of a touch by reading a change of potential of the selected touch detection electrode TS as a detection signal.

The common signal Vcom may be input to a non-selected touch detection electrode TS and a non-selected touch scan electrode TD disposed in a non-selected subarea B. Note that the non-selected touch scan electrode TD may be in a floating state.

In the touch detection step, a pixel potential is maintained in all the subareas B. That is, a TFT provided to each pixel is off. Note that all the source lines may be in a floating state.

As illustrated in FIG. 22, in the touch detection step, the plurality of gate lines (hereinafter referred to as "selected gate lines") disposed in the selected subarea B(Y) may be supplied with a gate signal having substantially the same phase and substantially the same amplitude as the scan signal. Thus, a delay of the scan signal is reduced, and it is possible to reduce noise generated in the detection signal. Note that the selected gate line may be in a floating state.

The gate line (non-selected gate line) disposed in the non-selected subarea B may be supplied with a gate OFF voltage Vgl. The gate OFF voltage Vgl is a voltage supplied to the gate line to turn off the TFT in the pixel. Note that the non-selected gate line may be in a floating state.

Pixel Writing Step

As illustrated in FIG. 21, in the pixel writing step, a common signal Vcom is input to the selected and non-selected touch detection electrodes TS and touch scan electrodes TD.

Moreover, as illustrated in FIG. 22, the plurality of selected gate lines disposed in the selected subarea B(Y) are sequentially driven (gate ON voltage Vgh is applied). The gate ON voltage Vgh is a voltage supplied to the gate line to turn on the TFT in the pixel. A voltage according to an image signal is applied from a source line SL to a pixel in which the TFT is turned on. Thus, writing is performed on pixels corresponding one low connected to the selected gate line driven in the selected subarea B(Y).

Table 1 collectively shows voltages of the gate line GL, the source line SL, the touch scan electrode TD, and the touch detection electrode TS in the touch detection step and the pixel writing step. In the table, "$V_M$" represents the voltage amplitude of a touch scan signal.

TABLE 1

| | DURING TOUCH DETECTION | | DURING |
| --- | --- | --- | --- |
| | SELECTED SUBAREA | NON-SELECTED SUBAREA | PIXEL WRITING |
| GATE | Vgl ± $V_M$ | Vgl (OR FLOATING) | NORMAL |
| SOURCE | FLOATING | | NORMAL |
| TOUCH SCAN ELECTRODE | Vcom ± $V_M$ | Vcom (OR FLOATING) | VCOM |
| TOUCH DETECTION ELECTRODE | Vcom | | VCOM |

A liquid crystal material adopted for a liquid crystal display generally has dielectric variance, and therefore, when the frequency increases (for example, several 10 kHz or higher), response gradually degrades. For example, when the frequency is $10^6$ to $10^8$ Hz or above, no response may be obtained. Thus, a driving time of an AC period is preferably shorter than or equal to 10 μsec and is more preferably 0.01 μsec or longer and 1 μsec or shorter.

INDUSTRIAL APPLICABILITY

A liquid crystal display apparatus with a touch sensor of the present embodiment of the present invention is particularly useful in a field of various types of electronic devices.

REFERENCE SIGNS LIST

2 PIXEL ELECTRODE
4 FIRST COMMON ELECTRODE
4p FIRST COMMON ELECTRODE PORTION
8 LIQUID CRYSTAL LAYER
9 SECOND COMMON ELECTRODE
9p SECOND COMMON ELECTRODE PORTION
10 FIRST SUBSTRATE
11 FIRST TRANSPARENT SUBSTRATE
12 SEALING MATERIAL
14 CONTACT COLUMN
16 SEMICONDUCTOR CHIP
18 TOUCH SCAN ELECTRODE CONTACT PART
20 SECOND SUBSTRATE
21 SECOND TRANSPARENT SUBSTRATE
32 GATE ELECTRODE
33 GATE INSULATING LAYER
34 SEMICONDUCTOR LAYER
36 SOURCE ELECTRODE
38 DRAIN ELECTRODE
41, 42 POLARIZING PLATE
43 ACTIVE MATRIX LAYER
44 FIRST COMMON ELECTRODE LAYER
46 PIXEL ELECTRODE LAYER
48 TOUCH SCAN LINE LAYER
50 FIRST INSULATING LAYER
50a INORGANIC INSULATING LAYER
50b ORGANIC INSULATING LAYER
52 SECOND INSULATING LAYER
54 THIRD INSULATING LAYER
60 COLOR FILTER LAYER
62 SECOND COMMON ELECTRODE LAYER
64 OVERCOAT LAYER
71 GATE DRIVER
72 SOURCE DRIVER
73, 73a, 73b SCAN DRIVER
74, 74a, 74b DETECTION DRIVER
76 CONTROL CIRCUIT
80 DISPLAY AREA
90 PERIPHERAL AREA
90x FIRST PERIPHERAL AREA
90y SECOND PERIPHERAL AREA
101, 102, 103, 104, 105, 201, 202, 203, 204 LIQUID CRYSTAL DISPLAY APPARATUS (TOUCH PANEL) WITH A TOUCH SENSOR
1001, 1002 TOUCH PANEL OF COMPARATIVE EXAMPLE
GL GATE LINE
SL SOURCE LINE
TD TOUCH SCAN ELECTRODE
TDL, TDLa, TDLb TOUCH SCAN LINE
TS TOUCH DETECTION ELECTRODE
TSL TOUCH DETECTION LINE
TU TOUCH DETECTION UNIT

The invention claimed is:

1. A liquid crystal display apparatus with a touch sensor, the liquid crystal display apparatus including a display area and a peripheral area, the display area including a plurality of pixels two-dimensionally arranged in a first direction and a second direction transverse to the first direction, the peripheral area being located in a periphery of the display area, the liquid crystal display apparatus comprising:
a first substrate;
a second substrate disposed to face the first substrate;
a liquid crystal layer provided between the first substrate and the second substrate;
a plurality of pixel electrodes and a first common electrode for applying a voltage to the liquid crystal layer; and
a plurality of first electrodes and a plurality of second electrodes for the touch sensor, wherein the plurality of first electrodes are a plurality of touch detection electrodes and the plurality of second electrodes are a plurality of touch scan electrodes, or the plurality of first electrodes are a plurality of touch scan electrodes and the plurality of second electrodes are a plurality of touch detection electrodes, wherein
the display area includes a plurality of touch detection units, each of the plurality of touch detection unit being a portion at which one of the plurality of touch detection electrodes crosses one of the plurality of touch scan electrodes,
the liquid crystal layer includes liquid crystals having negative dielectric anisotropy,
the first substrate includes
a first transparent substrate,
a plurality of gate lines each extending in the first direction,
a plurality of source lines each extending in the second direction,
the plurality of pixel electrodes disposed on a side of the first transparent substrate facing the liquid crystal layer, and
the first common electrode disposed on the side of the first transparent substrate facing the liquid crystal layer via the plurality of pixel electrodes and an insulating layer,
the second substrate includes
a second transparent substrate and
a second common electrode formed on a side of the second transparent substrate facing the liquid crystal layer,
the first common electrode includes a plurality of first common electrode portions, the plurality of first common electrode portions serving also as the plurality of first electrodes for the touch sensor, and
the second common electrode includes a plurality of second common electrode portions, the plurality of second common electrode portions serving also as the plurality of second electrodes for the touch sensor, and
the second substrate is disposed on an observer side of the first substrate,
the plurality of first common electrode portions serve also as the plurality of touch scan electrodes, and
the plurality of second common electrode portions serve also as the plurality of touch detection electrodes.

2. The liquid display device with the touch sensor according to claim 1, wherein
in the peripheral area, the first substrate further includes
a scan driver connected to the plurality of first common electrode portions and
a semiconductor chip mounting region in which a semiconductor chip is mounted, wherein the scan driver is disposed between either the semiconductor chip mounting region or the semiconductor chip mounting region and the display area.

3. The liquid display device with the touch sensor according to claim 2, wherein
the first substrate further includes a plurality of scan lines which connect the plurality of first common electrode portions to the scan driver, and
each of the plurality of scan lines has a portion located in the display area.

4. The liquid display device with the touch sensor according to claim 3, wherein
two or more of the scan lines are provided to each of the plurality of first common electrode portions.

5. The liquid display device with the touch sensor according to claim 1, wherein
each of the plurality of first common electrode portions extends in the display area in the first direction, and
each of the plurality of second common electrode portions extends across the display area in the second direction.

6. The liquid display device with the touch sensor according claim 1, wherein
each of the plurality of first common electrode portions extends across the display area in the second direction, and
each of the plurality of second common electrode portions extends across the display area in the first direction.

7. The liquid display device with the touch sensor according to claim 1, wherein
each of the plurality of second common electrode portions extends across the display area to the peripheral area, and
part of each of the plurality of second common electrode portions which is located in the peripheral area is electrically connected to a side of the first substrate via a contact column disposed between the first substrate and the second substrate.

8. The liquid display device with the touch sensor according to claim 1, wherein
the second substrate further includes a color filter layer, and
the second common electrode is disposed between the color filter layer and the second transparent substrate.

9. The liquid display device with the touch sensor according to claim 1, wherein
the second substrate further includes a color filter layer, and
the second common electrode is disposed between the color filter layer and the liquid crystal layer.

10. The liquid display device with the touch sensor according to claim 1, wherein
the plurality of pixel electrodes are disposed between the first common electrode and the liquid crystal layer.

11. The liquid display device with the touch sensor according to claim 1, wherein
the first common electrode is disposed between each of the plurality of pixel electrodes and the liquid crystal layer.

12. The liquid display device with the touch sensor according to claim 1, further comprising:
a gate driver connected to the plurality of gate lines;
a source driver connected to the plurality of source lines;
a scan driver connected to the plurality of touch scan electrodes;
a detection driver connected to the plurality of touch detection electrodes; and
a control circuit configured to perform control of the gate driver, the source driver, the scan driver, and the detection driver, wherein
each of the plurality of touch scan electrodes extend in the display area in the first direction,
the display area includes a plurality of subareas obtained by dividing the display area in the first direction,
the control circuit performs the control such that, after a touch detection operation and a pixel writing operation on a selected subarea of the plurality of subareas are finished, a touch detection operation and a pixel writing operation is performed on a next subarea, and after a touch detection operation is performed on each of the plurality of subareas with a pixel writing operation being stopped, a pixel writing operation is performed with a touch detection operation being stopped.

13. A liquid display device with the touch sensor, the liquid crystal display apparatus including a display area and a peripheral area, the display area including a plurality of pixels two-dimensionally arranged in a first direction and a second direction traverse to the first direction, the peripheral area being located in the periphery of the display area, the liquid crystal display apparatus comprising:
a first substrate;
a second substrate disposed to face the first substrate;
a liquid crystal layer provided between the first substrate and the second substrate;
a plurality of pixel electrodes and a first common electrode for applying a voltage to the liquid crystal layer; and
a plurality of first electrodes and a plurality of second electrodes for the touch sensor, wherein the plurality of first electrodes are a plurality of touch detection electrodes and the plurality of second electrodes are a plurality of touch scan electrodes, or the plurality of first electrodes are a plurality of touch scan electrodes and the plurality of second electrodes are a plurality of touch detection electrodes, wherein
the display area includes a plurality of touch detection units, each of the plurality of touch detection unit being a portion at which one of the plurality of touch detection electrodes crosses one of the plurality of touch scan electrodes,
the liquid crystal layer includes liquid crystals having negative dielectric anisotropy,
the first substrate includes
a first transparent substrate,
a plurality of gate lines each extending in the first direction,
a plurality of source lines each extending in the second direction,
the plurality of pixel electrodes disposed on a side of the first transparent substrate facing the liquid crystal layer, and
the first common electrode disposed on the side of the first transparent substrate facing the liquid crystal layer via the plurality of pixel electrodes and an insulating layer,
the second substrate includes
a second transparent substrate and
a second common electrode formed on a side of the second transparent substrate facing the liquid crystal layer,
the first common electrode includes a plurality of first common electrode portions, the plurality of first common electrode portions serving also as the plurality of first electrodes for the touch sensor, and the second common electrode includes a plurality of second common electrode portions, the plurality of second common electrode portions serving also as the plurality if second electrodes for the touch sensor, the first substrate is disposed on an observer side of the second substrate, the plurality of first common electrode portions serve also as the plurality of touch detection electrodes, and the plurality of second common electrode portions serve also as the plurality of touch scan electrodes.

14. The liquid display device with the touch sensor according to claim 13, wherein each of the plurality of first common electrode portions extends across the display area in the second direction, and each of the plurality of second common electrode portions extends across the display area in the first direction.

15. The liquid display device with the touch sensor according to claim 13, wherein each of the plurality of first common electrode portions extends across the display area in the first direction, and each of the plurality of second common electrode portions extends across the display area in the second direction.

16. The liquid display device with the touch sensor according to claim 13, wherein the second substrate further includes a color filter layer, and the second common electrode is disposed between the color filter layer and the second transparent substrate.

17. The liquid display device with the touch sensor according to claim 13, wherein the second substrate further includes a color filter layer, and the second common electrode is disposed between the color filter layer and the liquid crystal layer.

18. A liquid crystal display apparatus with a touch sensor, the liquid crystal display apparatus including a display area and a peripheral area, the display area including a plurality of pixels two-dimensionally arranged in a first direction and a second direction transverse to the first direction, the peripheral area being located in a periphery of the display area, the liquid crystal display apparatus comprising:

a first substrate;

a second substrate disposed to face the first substrate;

a liquid crystal layer provided between the first substrate and the second substrate;

a plurality of pixel electrodes and a first common electrode for applying a voltage to the liquid crystal layer; and a plurality of first electrodes and a plurality of second electrodes for the touch sensor, wherein the plurality of first electrodes are a plurality of touch detection electrodes and the plurality of second electrodes are a plurality of touch scan electrodes, or the plurality of first electrodes are a plurality of touch scan electrodes and the plurality of second electrodes are a plurality of touch detection electrodes, wherein the display area includes a plurality of touch detection units, each of the plurality of touch detection unit being a portion at which one of the plurality of touch detection electrodes crosses one of the plurality of touch scan electrodes, the liquid crystal layer includes liquid crystals having negative dielectric anisotropy, the first substrate includes a first transparent substrate, a plurality of gate lines each extending in the first direction, a plurality of source lines each extending in the second direction, the plurality of pixel electrodes disposed on a side of the first transparent substrate facing the liquid crystal layer, and the first common electrode disposed on the side of the first transparent substrate facing the liquid crystal layer via the plurality of pixel electrodes and an insulating layer, the second substrate includes a second transparent substrate and a second common electrode formed on a side of the second transparent substrate facing the liquid crystal layer, the first common electrode includes a plurality of first common electrode portions, the plurality of first common electrode portions serving also as the plurality of first electrodes for the touch sensor, the second common electrode includes a plurality of second common electrode portions, the plurality of second common electrode portions serving also as the plurality of second electrodes for the touch sensor, the plurality of pixel electrodes are disposed between the first common electrode and the liquid crystal layer.

19. The liquid display device with the touch sensor according to claim 18, wherein the second substrate further includes a color filter layer, and the second common electrode is disposed between the color filter layer and the second transparent substrate.

20. The liquid display device with the touch sensor according to claim 18, wherein the second substrate further includes a color filter layer, and the second common electrode is disposed between the color filter layer and the liquid crystal layer.

* * * * *